(12) United States Patent
Willekes et al.

(10) Patent No.: US 8,549,423 B2
(45) Date of Patent: Oct. 1, 2013

(54) LINKING AND MANAGING MATHEMATICAL OBJECTS

(75) Inventors: Tom Willekes, Calgary (CA); Kathryn Rounding, Calgary (CA); Gregory Gordon Forrest, Calgary (CA)

(73) Assignee: SMART Technologies ULC (CA)

( * ) Notice: Subject to any disclaimer, the term of this patent is extended or adjusted under 35 U.S.C. 154(b) by 0 days.

(21) Appl. No.: 13/553,147

(22) Filed: Jul. 19, 2012

(65) Prior Publication Data
US 2012/0284667 A1 Nov. 8, 2012

Related U.S. Application Data

(62) Division of application No. 12/477,485, filed on Jun. 3, 2009, now Pat. No. 8,250,482.

(51) Int. Cl.
*G06F 13/00* (2006.01)
*G06F 15/00* (2006.01)

(52) U.S. Cl.
USPC .......................................... 715/769; 715/764

(58) Field of Classification Search
USPC .................. 715/764–769, 851–853, 823, 801
See application file for complete search history.

(56) References Cited

U.S. PATENT DOCUMENTS

| | | |
|---|---|---|
| 6,529,217 B1 | 3/2003 | Maguire, III et al. |
| 6,610,106 B1 | 8/2003 | Jenks |
| 2001/0000963 A1* | 5/2001 | Deguchi .......................... 345/420 |
| 2005/0039145 A1* | 2/2005 | Diering et al. ................. 715/853 |
| 2007/0073705 A1* | 3/2007 | Gray ................................ 707/10 |
| 2007/0277090 A1 | 11/2007 | Raja et al. |
| 2008/0229223 A1* | 9/2008 | Kake .............................. 715/764 |
| 2009/0076978 A1 | 3/2009 | Dayan |
| 2010/0074141 A1* | 3/2010 | Nguyen ......................... 370/254 |
| 2010/0083109 A1 | 4/2010 | Tse et al. |

OTHER PUBLICATIONS

Casio ClassPad 330 ClassPad as Version 3.03 User's Guide [online], 1999-2002, [retrieved on Sep. 10, 2009] retrieved from <http://support.casio.com/pdf/004/CP330ver303_Eng.pdf>.
SMART Ideas help [online], 2005, [retrieved on Sep. 10, 2009] retrieved from <http://www.smarttech.com/products/smarlideas/help/50/eni>.

* cited by examiner

*Primary Examiner* — Cao "Kevin" Nguyen
(74) *Attorney, Agent, or Firm* — Katten Muchin Rosenman LLP

(57) ABSTRACT

A method for creating a second mathematical object based on a first mathematical object in a computing apparatus having a graphical user interface includes selecting a first mathematical object in response to an instruction received from a user; creating a second mathematical object using data of said first mathematical object; linking said first mathematical object to said second mathematical object; and creating a visual link between said first mathematical object and said second mathematical object.

11 Claims, 41 Drawing Sheets

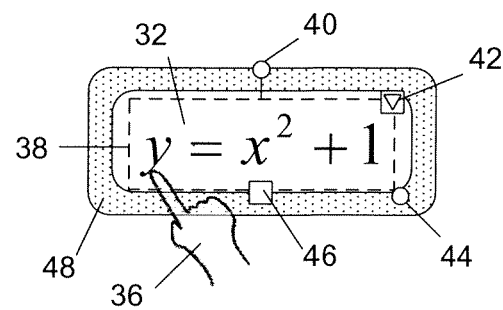
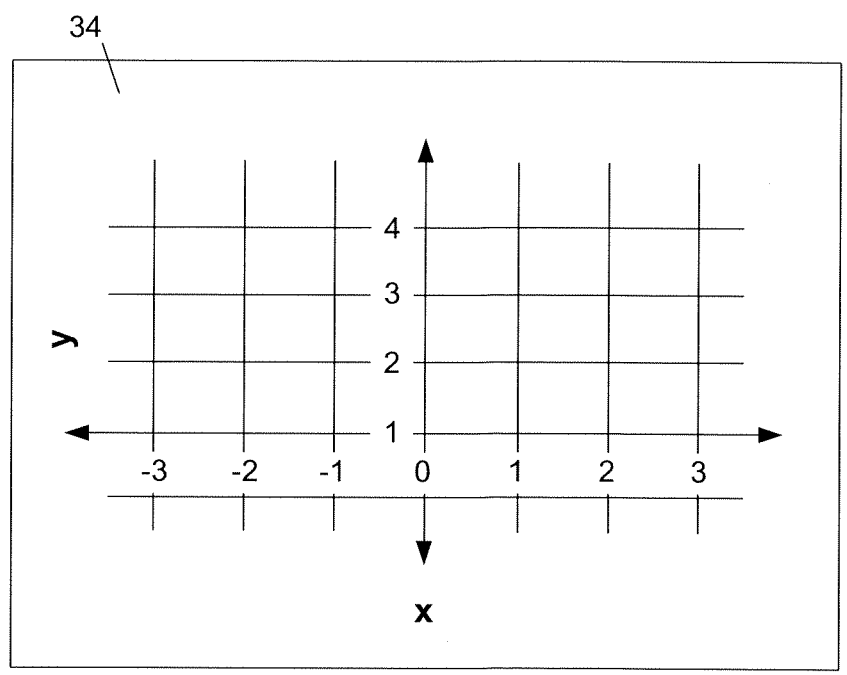
Fig. 4A $$y = x^2 + 1$$

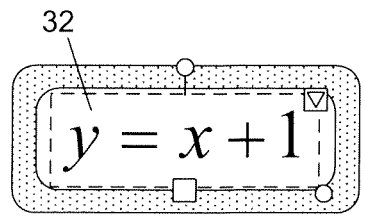
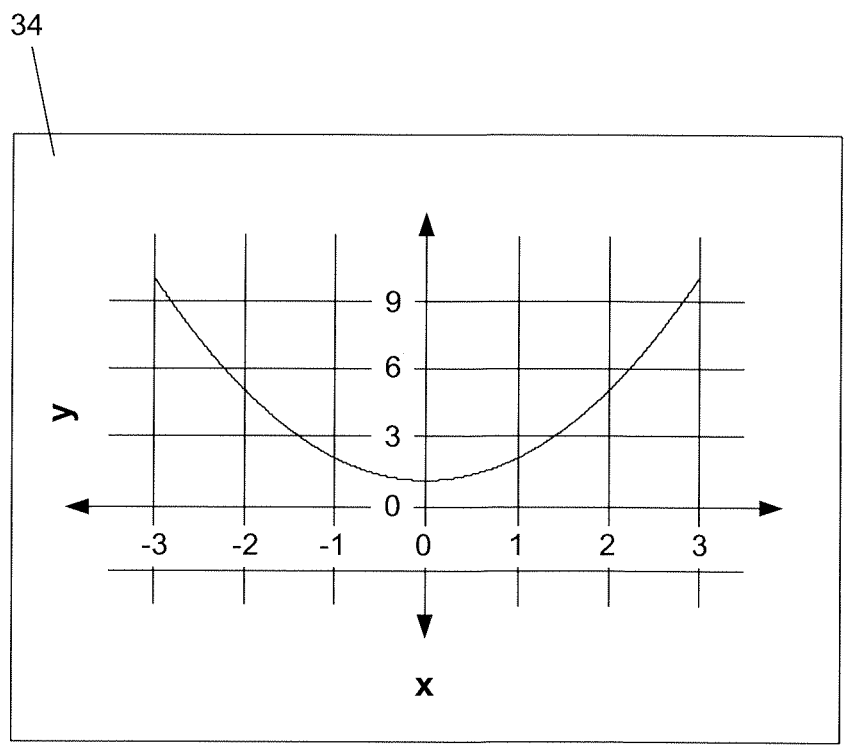
Fig. 6

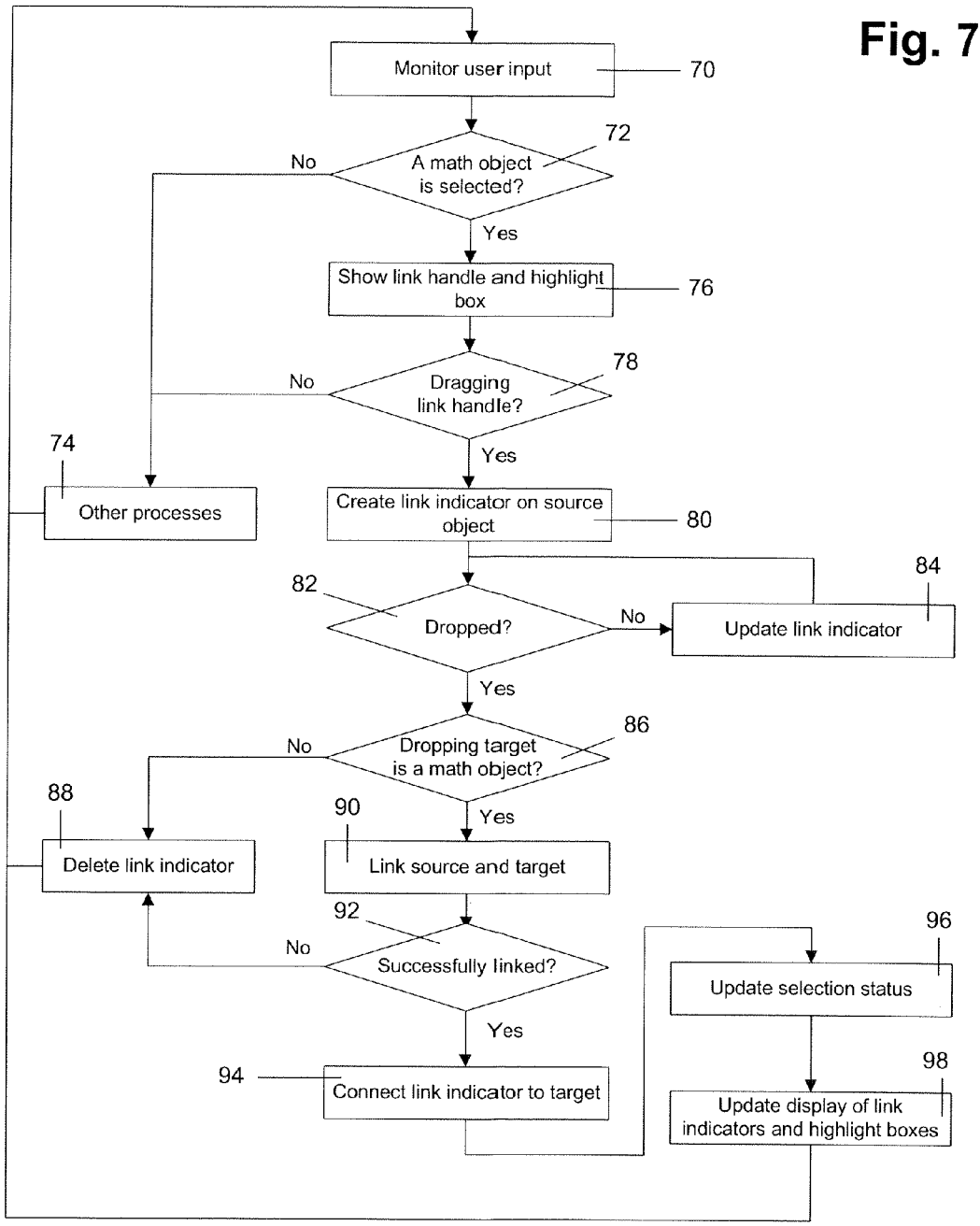

| x  | y | z |
|----|---|---|
| -3 | 3 |   |
| -2 | 2 | 1 |
| -1 | 1 | 2 |
| 0  | 0 | 3 |
| 1  | 1 | 4 |
| 2  | 2 | 5 |
| 3  | 3 | 6 |
| -3 | 10| 7 |
| -2 | 5 |   |
| -1 | 2 |   |
| 0  | 1 |   |
| 1  | 2 |   |
| 2  | 5 |   |
| 3  | 10|   |

604

Fig. 18B $$\begin{cases} y = x^2 + 1 \\ y = 2x - 3 \end{cases} \text{---- 744}$$

LINKING AND MANAGING MATHEMATICAL OBJECTS

CROSS-REFERENCE TO RELATED APPLICATION

This application is a divisional of U.S. patent application Ser. No. 12/477,485 filed on Jun. 3, 2009 the contents of which is incorporated herein by reference.

FIELD OF THE INVENTION

The present invention relates generally to objects in a computing environment, and in particular to a method for relating at least two mathematical objects in a computing apparatus, and a computer readable medium and interactive input system embodying the method.

BACKGROUND OF THE INVENTION

Interactive input systems that allow users to input ink into an application program using an active pointer (e.g., a pointer that emits light, sound or other signal), a passive pointer (e.g., a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); touch-enabled laptop PCs; personal digital assistants (PDAs); and other similar devices.

Interactive input systems provide users with great flexibility to process electronic documents. Electronic document processing software programs are known that allow users to incorporate and manipulate mathematical objects, such as equations, tables, and graphs, in electronic documents. For example, Microsoft Excel™ software allows users to enter characters and numbers into the cells of a spreadsheet, and generate a graph, such as a bar chart, line curve or pie chart, from the content of the cells the user selected. When the user changes the content of a cell that is used to generate the graph, the graph is automatically updated. When a graph is selected, the cells that the graph is generated from are also marked with highlighted border (see FIG. 1).

When using Microsoft Excel™, a user has to select a graph and then identify the cells with highlighted border to locate the cells that the graph was generated from, which may be difficult for the user. When the cells with highlighted border are located beyond the Microsoft Excel™ window, the user has to move around the entire spreadsheet to find the cells with highlighted border. Moreover, if these cells are under a graph, it is almost impossible for the user to find their location.

U.S. Pat. No. 7,289,120 to Fukaya teaches a graphic display control apparatus that has a geometrical window and a formula window. A formula string in the formula window can be dragged/copied from the formula window and dropped/pasted into the geometrical window to draw a graph of the formula, and vice versa. A link may also be created between the formula in the formula window and the graph in the geometrical window so that when the user changes the formula in the formula window or the graph in the geometrical window, respectively, the graph in the geometrical window or the formula in the formula window will be automatically updated. A mark may be added to the proximity of a formula to indicate that the formula is linked (instead of copied) to the geometrical window. However, U.S. Pat. No. 7,289,120 does not teach how a user can distinguish such a mark from other similar marks and how to identify the source data of a graph when multiple geometrical windows and formula windows exist in the same display screen.

The functionality of the aforementioned methods is also limited. For example, they do not allow the user to separate a graph or a geometrical window, respectively, from the cells or formula window it is linked to. Moreover, they do not allow the user to relate two mathematical objects of the same type (e.g., relating two graph objects).

Therefore, there is a need to provide a novel method of linking and managing mathematical objects in an interactive input system and a novel interactive input system executing the method.

SUMMARY OF THE INVENTION

According to an aspect there is provided a method for creating a second mathematical object based on a first mathematical object in a computing apparatus having a graphical user interface, said method comprising selecting a first mathematical object in response to an instruction received from a user; creating a second mathematical object using data of said first mathematical object; linking said first mathematical object to said second mathematical object; and creating a visual link between said first mathematical object and said second mathematical object.

According to another aspect, there is provided a method for relating at least two mathematical objects in a computing apparatus having a graphical user interface, said method comprising receiving an instruction from a user to associate a shape object with a graph object, said shape object being a different type than said graph object; determining data representing one or more vertices of the shape object based on the location of said shape object relative to said graph object; and drawing the shape object on the graph object using the data representing the one or more vertices of the shape object.

According to another aspect, there is provided a non-transitory computer readable medium embodying a computer program for creating a second mathematical object based on a first mathematical object in a computing apparatus having a graphical user interface, the computer program comprising computer program code selecting a first mathematical object in response to an instruction received from a user; computer program code creating a second mathematical object using data of said first mathematical object; computer program code linking said first mathematical object to said second mathematical object; and computer program code creating a visual link between said first mathematical object and said second mathematical object.

According to another aspect, there is provided a non-transitory computer readable medium embodying a computer program for relating at least two mathematical objects in a computing apparatus having a graphical user interface, the computer program comprising computer program code receiving an instruction from a user to relate a shape object with a graph object, said shape object being a different type than said graph object; computer program code determining data representing one or more vertices of the shape object based on the location of said shape object relative to said graph object; and computer program code drawing the shape object on the graph object using the data representing the one or more vertices of the shape object.

BRIEF DESCRIPTION OF THE DRAWINGS

Embodiments will now be described, by way of example only, with reference to the attached drawings, wherein:

FIGS. 4A to 4D are exemplary illustrations of the graphical user interface when an equation object is linked to a graph object;

FIG. 6 is an exemplary view of the graphical user interface after the link between the two objects is removed;

FIG. 7 is a flowchart showing the steps performed by the processing structure for establishing a link between two mathematical objects;

FIGS. 18A and 18B are illustrations of the graphical user interface when a table object is merged to another table object;

DETAILED DESCRIPTION OF THE PREFERRED EMBODIMENT

In the following, a method and tool for linking and managing mathematical objects is described. The tool is preferably implemented in software, which when executed by a processing device allows a mathematical object to be linked to another mathematical object. A visual link is then created to connect the linked objects. The software tool also allows a mathematical object to be merged into another mathematical object having the same type.

For the purposes of the following, it will be understood that a mathematical object may be, for example, a table, an equation/formula, a graph, or a shape. For clarity, a table is a set of data that may be represented in a table form with or without a border or as a matrix. An equation/formula is a character string representing a mathematical concept, or a graphical equation object representing a mathematical concept such as for example the MathType™ equation object offered by Design Science. A graph is a graphical representation of a set of data or at least one equation/formula in the form of a chart such as a scatter chart, line chart, bar chart, pie chart or some other chart. As will be described, a graph may contain more than one type of chart (such as both a line chart and a bar chart). Empty graph objects (containing no chart) or empty equation/formula objects may also be created and subsequently associated with data and/or equations/formulas as desired by a user. A shape object is similar to a graph object, and may be represented by underlying data including coordinates of vertices of the shape, or as a set of vectors.

Figure 1:
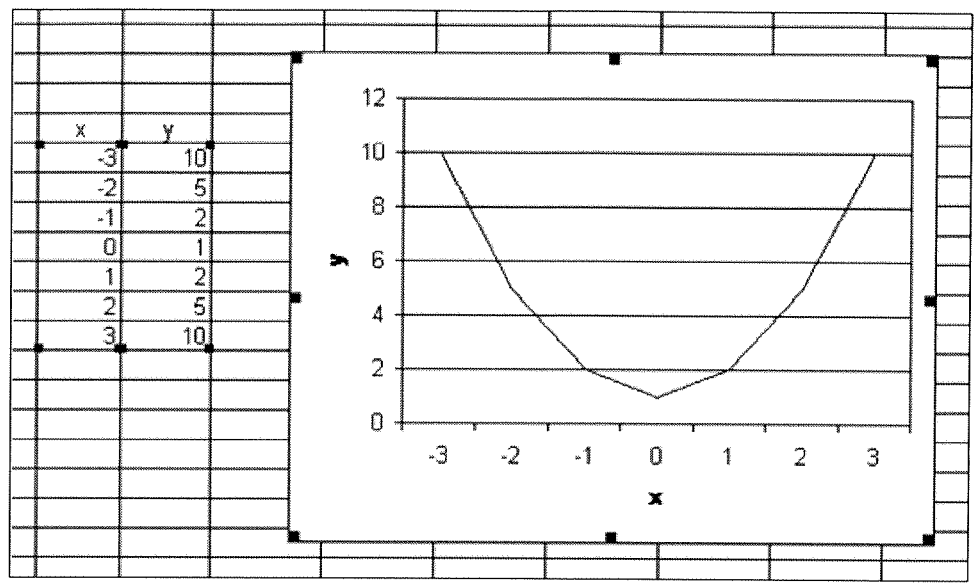
FIG. 1 is an exemplary view of prior art showing a graph linked to a table.
Figure 2:
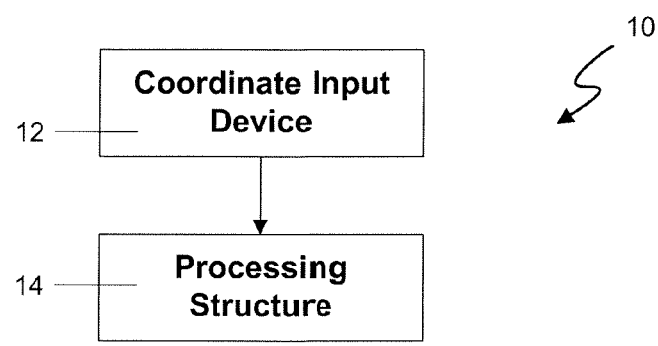
FIG. 2 is a block diagram of the interactive input system.

Turning now to FIG. 2, a block diagram of an interactive input system is shown and is generally identified by reference numeral 10. Interactive input system 10 comprises a coordinate input device 12 such as for example a touch panel on which pointer contacts can be made. The coordinate input device 12 communicates with processing structure 14 executing one or more application programs. Image data generated by the processing structure 14 is displayed on the display surface of the coordinate input device 12 allowing a user to interact with the displayed image via pointer contacts on the coordinate input device 12. The processing structure 14 interprets pointer contacts as input to the running application program and updates the image data accordingly so that the image displayed on the display surface reflects the pointer activity. In this manner, the coordinate input device 12 and processing structure 14 form a closed loop allowing pointer interactions with the coordinate input device 12 to be recorded as handwriting or drawing or used to control execution of the application program. The coordinate input device 12 of the interactive input system 10 may be separate from the processing structure 14 as is shown in the above-incorporated patents assigned to SMART Technologies ULC of Calgary, Alberta, Canada, or may be combined with the processing structure 14 to form an integral compact unit as in the case of personal computers (PCs), tablet PCs, laptop PCs, personal digital assistants (PDAs), cellular telephones or other suitable devices. Other input devices (not shown), such as for example a mouse and/or a keyboard, may also be used in the interactive input system as the coordinate input device.

The processing structure 14 in this embodiment is a general purpose computing device in the form of a computer. The computer comprises for example, a processing unit, system memory (volatile and/or non-volatile memory), other nonremovable or removable memory (a hard disk drive, RAM, ROM, EEPROM, CDROM, DVD, flash memory etc.) and a system bus coupling the various computer components to the processing unit. It will be understood that the computer may also include a subsystem for communicating with other computers such as that which employs Ethernet, WiFi, or some other network communications format.

The processing structure 14 runs a host software application such as SMART Notebook™ offered by SMART Technologies ULC of Calgary, Alberta, Canada. As is known, during execution, the SMART Notebook™ application provides a graphical user interface comprising a canvas page or palette, that is presented on the display surface of the coordinate input device 12, and on which freeform or handwritten ink objects together with other computer generated objects can be input and manipulated via pointer interaction with the coordinate input device 12, or via other input devices.

Figure 3:
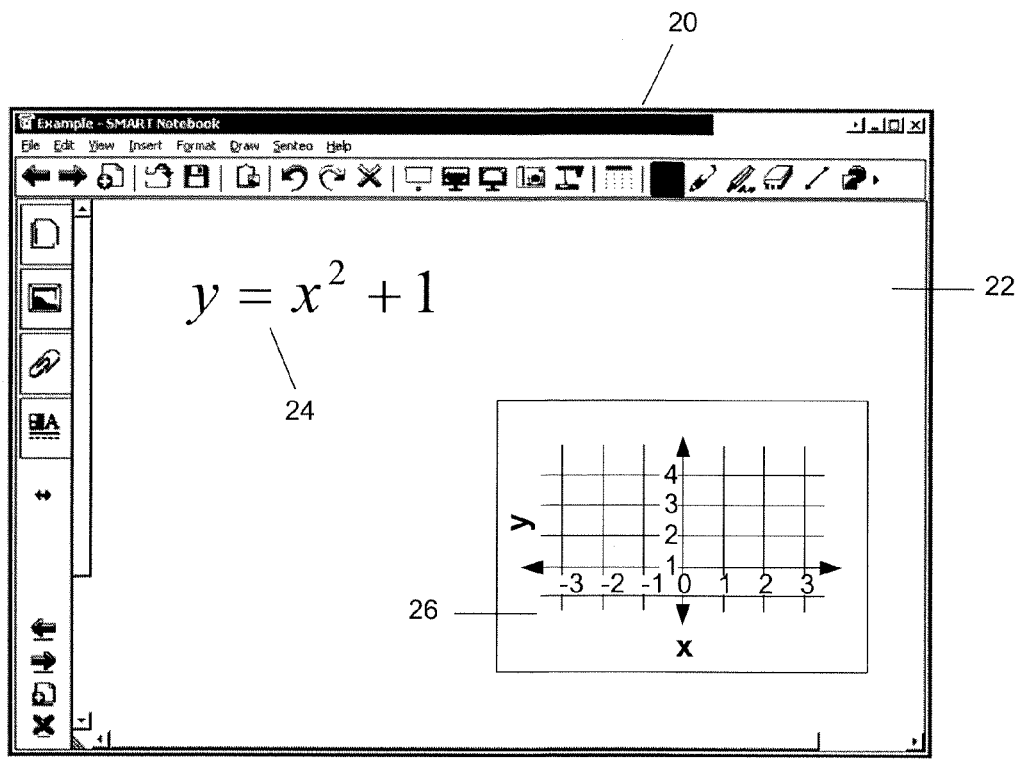
FIG. 3 shows a graphical user interface containing mathematical objects.

FIG. 3 shows the graphical user interface 20 presented on the display surface of the coordinate input device 12 as a SMART Notebook™ application window. In this figure, an equation object 24 representing a mathematical equation has been created and displayed on the canvas page 22 of the graphical user interface 20 through use of a menu item or a toolbar button (not shown). An empty graph object 26 has also been created and displayed on the canvas page 22.

Figure 4B:
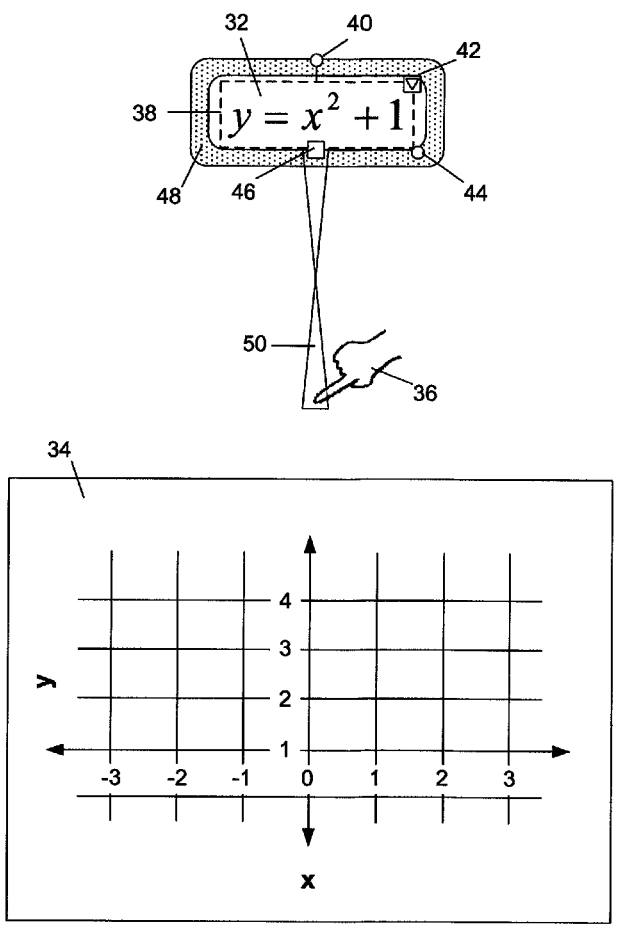
Figure 4C:
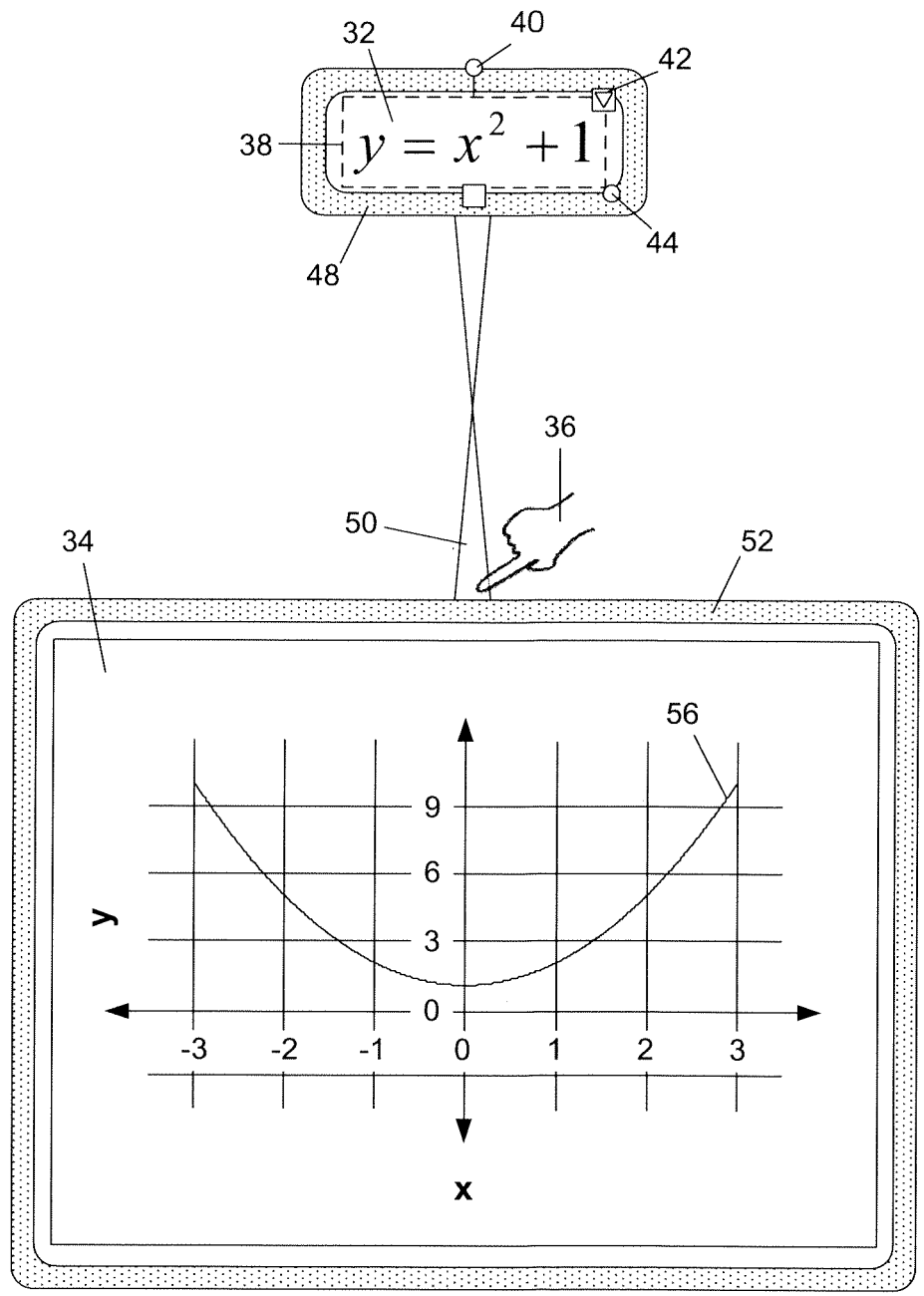

FIGS. 4A to 4C illustrate how a link between two mathematical objects is created based on instructions received from the user via the graphical user interface 20. For the purposes of the following, a link can be created at the instruction of the user between mathematical objects if the mathematical objects have compatible underlying data. For example, a table object as the source object may be linked with a graph object as the target object if the data underlying the table object (i.e., the data in the table) may be plotted in a chart form and thereby represented by the graph object. A graph object as the source object may be linked with a table object as the target object if the chart represented by the graph object can be sampled and represented, for example, as coordinates in the table object. A table object as the source object may be linked with an equation/formula object as the target object if the data underlying the table object can be processed and represented by mathematical statement in the form of an equation/formula. Further examples showing compatibility and incompatibility of mathematical objects are explained in further detail hereafter.

As shown in FIG. 4A, an equation object 32 and a graph object 34 are displayed on the graphical user interface. The equation object 32 is then selected by the user by tapping the pointer (e.g. the finger 36) or clicking the mouse cursor on the equation object 32, or by using the keyboard (not shown).

Selection of the equation object 32 automatically causes the equation object 32 to be highlighted by displaying a dash-line border 38 around the selected object 32, together with a rotation handle 40, a context menu 42, a scaling handle 44, and a link handle 46. In addition, a highlight box 48 is also shown around the equation object 32 to indicate that the selected object is a mathematical object.

After selecting the equation object 32, the user selects and drags on the link handle 46. As shown in FIG. 4B, with the dragging, a visual link indicator 50 is displayed, which extends from the equation object 32 to the current location of the point 36, so as to follow the pointer 36.

Figure 4D:
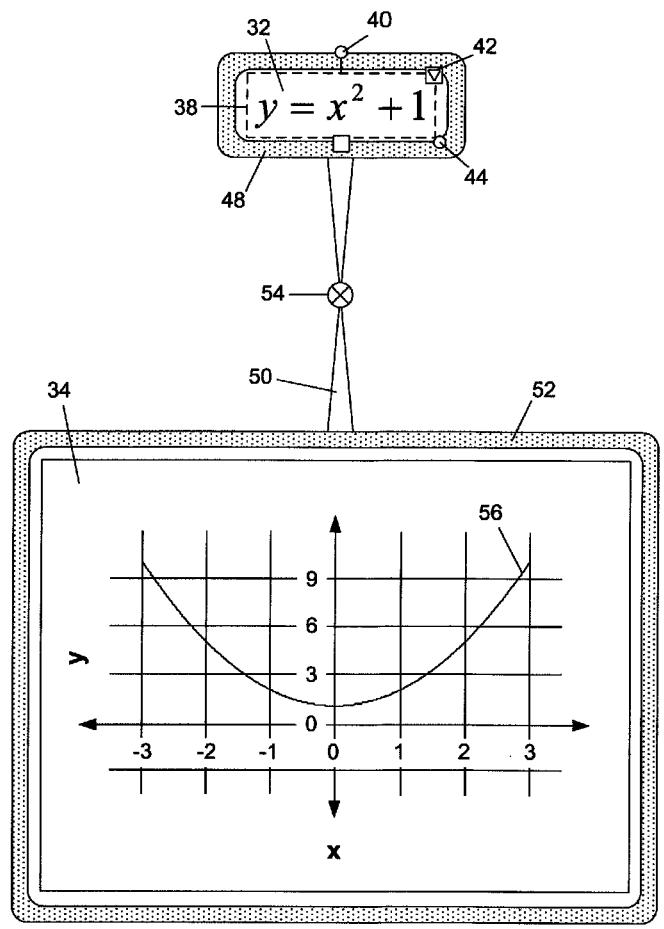

As illustrated in FIG. 4C, when the user drags the link indicator 50 over the graph object 34, the graph object 34 automatically becomes highlighted with a highlight box 52. As shown in FIG. 4D, when the user drops the link indicator 50 on the graph object 34 (by lifting the pointer, deselecting the mouse button, or similar), and a link may be established, the link indicator 50 remains connected to the graph object 34, and a visual and logical link between the equation object 32 and the graph object 34 is then established. Consequently, a graphical representation, e.g., a curve 56, of the equation object 32 is drawn in the graph object 34.

Figure 5:
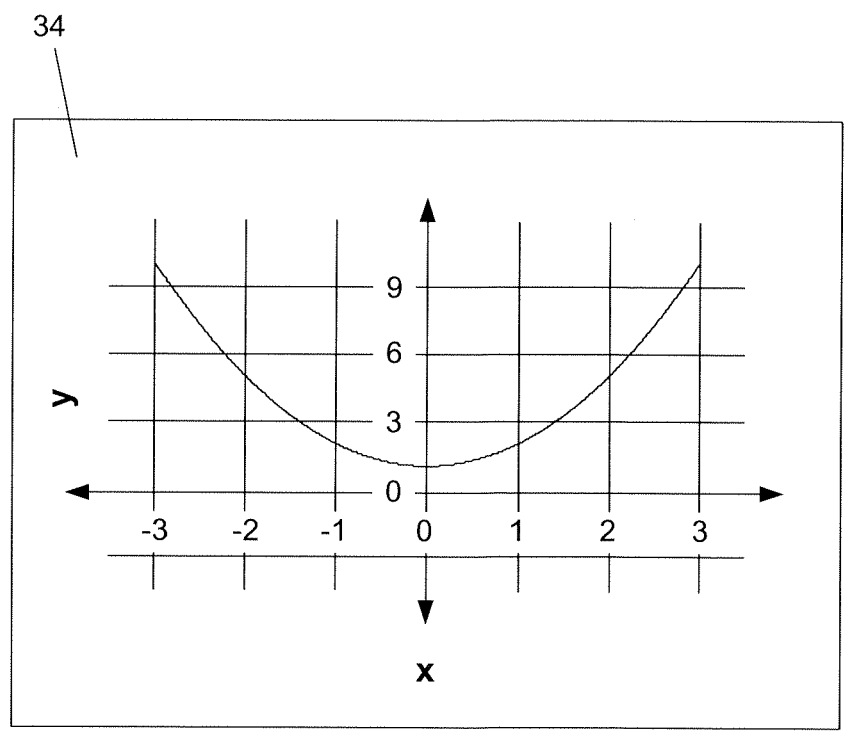
FIG. 5 is an exemplary view of the graphical user interface when the linked objects are not selected.

In order to control the amount of visual clutter displayed on the graphical user interface, the link indicator 54 and the highlight boxes 48 and 52 are only displayed if at least one of the linked objects is selected. That is, when at least one of the linked objects is selected, the link indicator and highlight boxes are displayed on the graphical user interface as shown in FIG. 4D. When the user deselects the equation object 32 (e.g., by tapping the pointer on the white space of the graphical user interface) so that no linked object is selected, (see FIG. 5), the link indicator and highlight boxes are not displayed on the graphical user interface.

When a link is established between mathematical objects, updating an object causes all objects linked thereto to be automatically updated accordingly, as will be described.

While the link indicator 50 is connected to the graph object 34, a link removal button 54 is displayed on the link indicator 50. The user may click the link removal button 54 to delete the link between the linked objects, as will be described in further detail hereafter.

Referring to FIG. 4D, when the user clicks the link removal button 54 on the link indicator 50, the visual link indicator 50 between the equation object 32 and the graph object 34 is deleted and the two objects become no longer linked logically. Thus, after deleting of the link, subsequent updating of the equation object 32 (or the graph object 34) or changing its selection status will not affect the graph object 34 (or the equation object 32) from which the equation object 32 has been unlinked. FIG. 6 shows the two objects 32 and 34 after deleting the link between them. In this figure, the equation object 32 is selected and its content is modified to the equation "y=x+1". However, because the graph object 34 not anymore linked to, and is now independent of, the equation object 32, the graph object 34 is not updated, and it is not highlighted as in FIG. 4D.

Turning now to FIG. 7, the general steps in the method performed by the processing structure for establishing a link between two mathematical objects are shown. During the method, the processing structure continually monitors user input (step 70) to determine whether a mathematical object has been selected (step 72). If no mathematical object has been selected, the processing structure executes other processes (step 74) and then goes back to step 70 to monitor user input. If a mathematical object has been selected at step 72, the processing structure marks the object as selected, shows regular selection marks, e.g., the dash-line border 38 together with control handles comprising the rotation handle 40, context menu button 42 and scaling handle 44 (see FIG. 4A), and shows the link handle and the highlight box (step 76). At this step, if the selected object has already been linked to one or more objects, the corresponding link indicators and highlight boxes of the object(s) to which the selected object has been linked are also shown on the graphical user interface.

With the object having been selected, the processing structure then checks whether the user has started to drag the link handle (step 78). If not, the processing structure branches to step 74 for other processes and loops back to step 70. Once the processing structure detects that the user has started to drag the link handle, the processing structure then displays a link indicator on or at the proximity of the source object (i.e., the object being selected), and assigns the link indicator as the object being dragged (step 80).

The processing structure continues to monitor the dragging operation, and checks whether the link indicator is dropped (step 82). If not, the processing structure updates the link indicator so that the link indicator visually extends along the movement of the pointer (step 84). In this step, the processing structure also monitors whether the link indicator is dragged over a potential target object. A potential target object is highlighted with a highlight box if the link indicator is dragged over the potential target object, and the highlight box is made to disappear again when the link indicator is dragged off of the potential target object.

After updating the link indicator and highlight boxes, the process loops back to step 82 to check whether the link indicator has been dropped (i.e. the pointer lifted or the mouse button deselected). If the link indicator has in fact been dropped, the processing structure detects whether the link indicator has been dropped on a mathematical object (step 86). If the link indicator has not been dropped on a mathematical object, the objects are deemed mathematically incompatible, the link indicator is deleted (step 88), and the process loops back to step 70.

If the target object on which the link indicator has been dropped is a mathematical object, the processing structure attempts to link the source and target objects (step 90), and accordingly sets a feedback message to either "Successfully linked" or "Linkage failed". The detail of step 90 will be described later with reference to FIGS. 8A to 8D.

At step 92, the feedback message is checked. If the two objects have not been successfully linked ("Linkage failed"), which will occur if the two objects are deemed mathematically incompatible, the link indicator is deleted (step 88) and the process loops back to step 70. If the two objects are successfully linked ("Successfully linked"), the link indicator remains and is connected to the target object (step 94). The highlight boxes on the source and target objects, respectively, remain visible on the graphical user interface.

The processing structure then updates the object selection status (step 96). At this step, the processing structure may keep the source object to be selected. Alternatively, the processing structure may set the source object to be unselected. In step 98, the processing structure updates the display of the link indicator and highlight boxes based on the object selection status. If an object has been selected, the link indicators and highlight boxes associated with the selected object and all other objects that are linked thereto are displayed. If no object has been selected, all link indicators and highlight boxes are hidden from showing on the graphical user interface, in order to mitigate visual clutter. After updating the display status of link indicators and highlight boxes, the process loops back to step 70.

At step 90, the link between the source and target objects is created in accordance with the type of objects being linked. FIGS. 8A to 8D illustrate this in further detail.

Figure 8A:
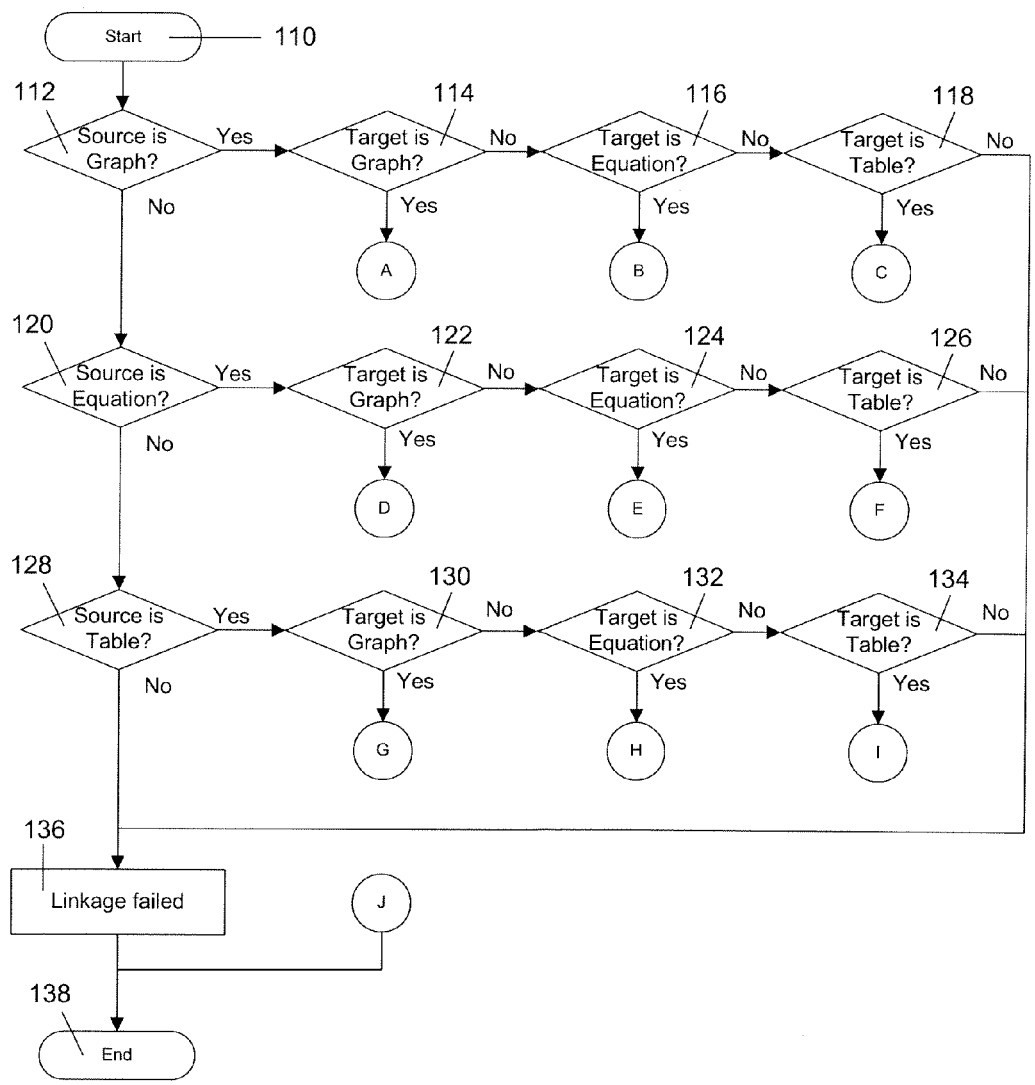
FIGS. 8A to 8D are flowcharts showing the steps performed by the processing structure for linking the source mathematical object to the target mathematical object.

As shown in FIG. 8A, when step 90 starts (step 110), the processing structure first determines whether the type of the source object is a graph (step 112). If the type of the source object is determined to be a graph, the processing structure determines whether the type of the target object is a graph (step 114), an equation/formula (step 116), or a table (step 118). Based on the determining, the process branches to an appropriate process entry point (connectors A to C, connecting the processes shown in FIG. 8*b*). If the target object is not in fact a mathematical type (the "No" branch of step 118), the process branches to step 136, and the processing structure sets a "Linkage failed" message. The step 90 is then ended (step 138) with the "Linkage failed" message.

At step 112, if the type of the source object is not a graph, the processing structure checks whether the type of the source object is an equation/formula (step 120). If the type of the source object is an equation/formula, the processing structure checks whether the type of the target object is a graph (step 122), an equation/formula (step 124), or a table (step 126). The processing structure then branches to appropriate processing entry points (connectors D to F, connecting the processes shown in FIG. 8C). If the type of the target object is not mathematical (the "No" branch of step 126), the process branches to step 136, and the processing structure sets a "Linkage failed" message. The step 90 is then ended (step 138) with the "Linkage failed" message.

At step 120, if the type of the source object is not an equation/formula, the processing structure checks whether the type of the source object is a table (step 128). If the type of the source object is a table, the processing structure checks whether the type of the target object is a graph (step 130), an equation/formula (step 132), or a table (step 134). The processing structure then branches to appropriate processing entry points (connectors G to I, connecting the processes shown in FIG. 8*d*). If the type of the target object is not mathematical (the "No" branch of step 134), the process branches to step 136, and the processing structure sets a "Linkage failed" message. The step 90 is then ended (step 138) with the "Linkage failed" message.

At step 128, if the source object is not a mathematical object, the process branches to step 136, and the processing structure sets a "Linkage failed" message. The step 90 is then ended (step 138) with the "Linkage failed" message.

Figure 8B:
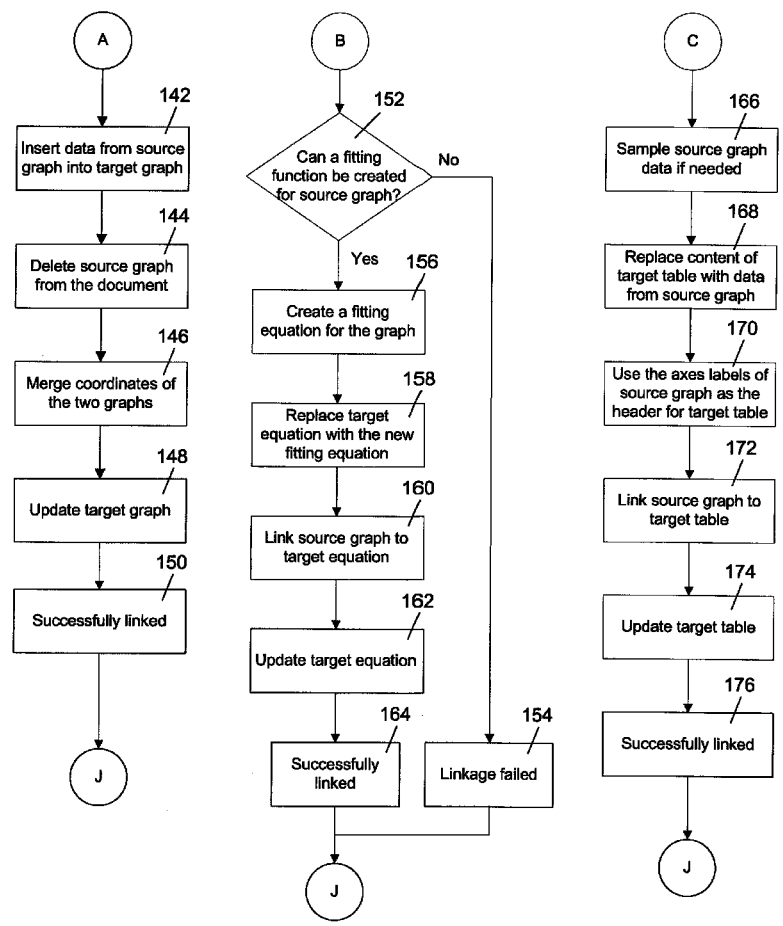

FIG. 8B illustrates the general steps of linking the source and target objects when the type of the source object is a graph. If the type of the target object is also a graph, the processing structure branches to the process at connector A. The processing structure first inserts the data of the source graph object into the target graph object (step 142), and deletes the source graph from the electrical document (step 144). Then, the processing structure merges the coordinates of the data inserted from the source graph object with the coordinates of the data of the target graph object (step 146). In this embodiment, the user's preference establishes which of various coordinates-merging methods can be employed at this point. For example, one object's coordinates may be established as the reference set of coordinates and the other object's coordinates accordingly converted. Alternatively, two sets of coordinates can be maintained and respectively employed to display two set of axes/units simultaneously. After the coordinates have been merged in the target graph object, the processing structure updates the target graph object, causing the charts originally shown in the source graph object to be merged into the target graph object. Then, the processing structure sets a "Successfully linked" message (step 150) and the process branches via connector J to step 138 (see FIG. 8A), i.e., ending the step 90 (see FIG. 7) with the "Successfully linked" message.

Shown in FIG. 8B, if the type of the target object is an equation/formula, the processing structure branches to the process at connector B. The processing structure first checks whether a fitting function that best fits the chart in the graph object can be created (step 152). If not, the processing structure sets a "Linkage failed" message (step 154) and branches via connector J to step 138 (see FIG. 8A), i.e., ending the step 90 (see FIG. 7) with the "Linkage failed" message.

If at step 152, it is determined that a fitting function as described above can be created, the processing structure creates a fitting function by using one of a spline function, a Bessel function, or another appropriate functions or analysis method (step 156). Then, the processing structure replaces the target equation object with the new fitting function (step 158), and establish a link between the source graph object and the target equation object (step 160). The target equation object is updated to shown the new fitting function on the graphical user interface (step 162). After that, a "Successfully linked" message is set (step 164) and the process branches via connector J to step 138 (see FIG. 8A), i.e., ending the step 90 (see FIG. 7) with the "Successfully linked" message.

In FIG. 8B, if the type of the target object is a table, the processing structure branches to the process at connector C. At step 166, in the event that the chart is a curve, the processing structure samples the chart to determine coordinates on the curve. According to the user's preference, the number of samples taken may be equal to the number of rows in the target table object, or may be determined by a predefined number. The processing structure then replaces the content of the target table object with data obtained from the source graph object (step 168). The table header is set to the axes labels of the source graph object (step 170). A link between the source and target objects is then established (step 172), and the target table object is updated to show the coordinates that have been obtained from the source graph object (step 174). After setting a "Successfully linked" message (step 176), the process branches via connector J to step 138 (see FIG. 8A), i.e., ending the step 90 (see FIG. 7) with the "Successfully linked" message.

Figure 8C:
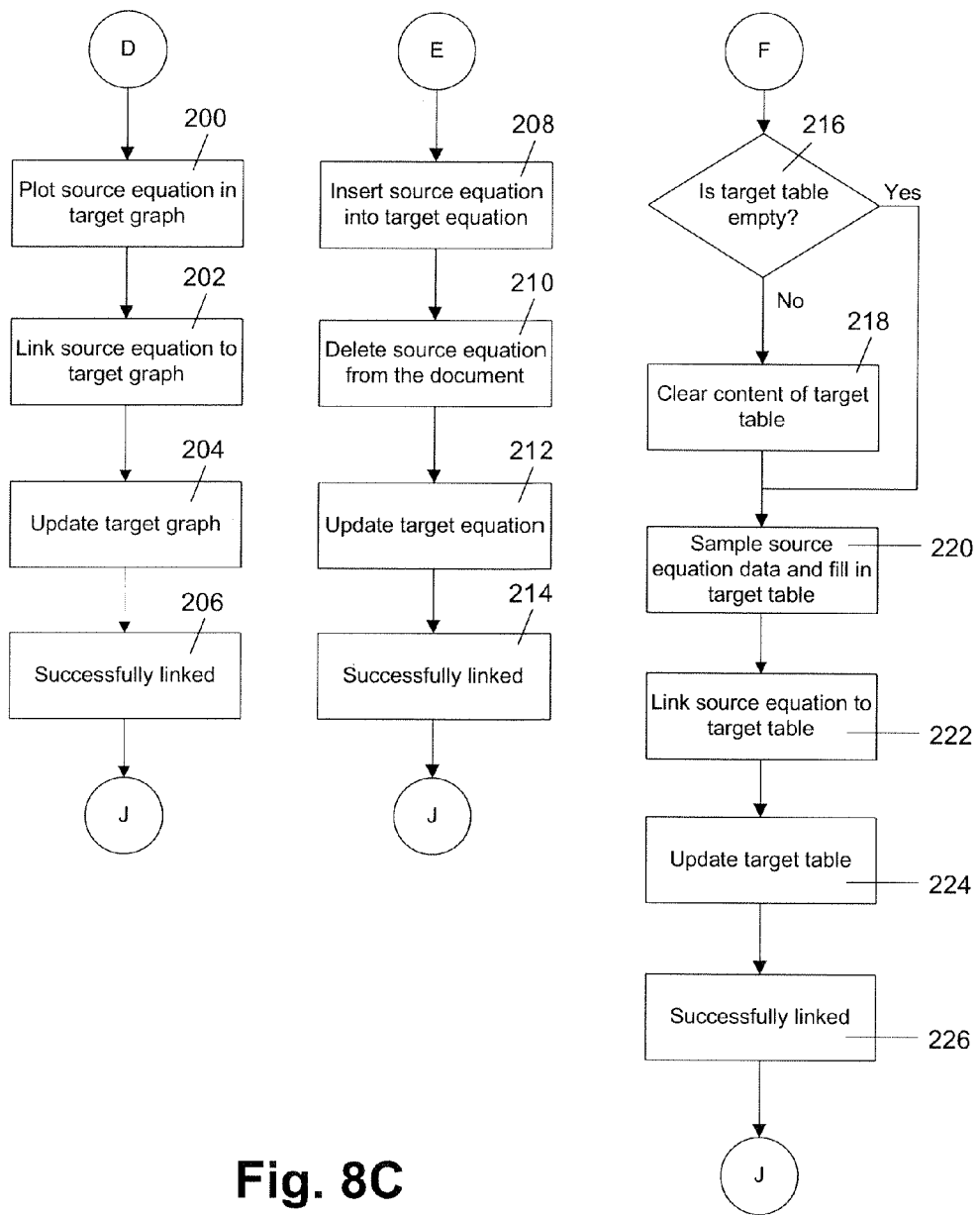

FIG. 8C illustrates the general steps of linking the source and target objects when the type of the source object is an equation/formula. If the type of the target object is a graph, the processing structure branches to the process at connector D. The processing structure first generates a chart by using the equation(s) in the source equation object, and replaces the chart in the target object with the generated chart (step 200). A link between the source and target objects is then created (step 202), and the target graph object is updated to show the chart of the source equation(s) (step 204). After setting a "Successfully linked" message (step 206), the process branches via connector J to step 138 (see FIG. 8A), i.e., ending the step 90 (see FIG. 7) with the "Successfully linked" message.

If the type of the target object is also an equation/formula, the processing structure branches to the process at connector E. The processing structure first inserts the equation(s) of the source equation object into the target equation object (step 208) to form a simultaneous equation set, and deletes the source object (step 210). Then, the processing structure updates the target object to display the equation set along with the on the graphical user interface (step 212). After setting a "Successfully linked" message (step 214), the process branches via connector J to step 138 (see FIG. 8A), i.e., ending the step 90 (see FIG. 7) with the "Successfully linked" message.

In FIG. 8C, if the type of the target object is a table, the processing structure branches to the process at connector F. At step 216, the processing structure checks whether the target table object is empty. If the target object is empty, the process jumps to step 220. If the target object is not empty, the processing structure first clears the contents from the target table object (step 218), and goes to step 220.

At step 220, the processing structure creates coordinates by sampling the equation(s) in the source equation object using selected independent variables, and populates the target table object with the created coordinates. According to the user's preference, the number of coordinates may be equal to the number of rows in the target table object and the samples of the independent variables are determined by the numbers in some columns. Alternatively, the number of samples may be a predefined number. The table header is set to be the independent/dependent variables.

After filling in the target table object, a link between the source and target objects is established (step 222), and the target table object is updated to shown the data obtained from the source equation object (step 224). Then, the processing structure sets a "Successfully linked" message (step 226), and branches the process via connector J to step 138 (see FIG. 8A), i.e., ending the step 90 (see FIG. 7) with the "Successfully linked" message.

Figure 8D:
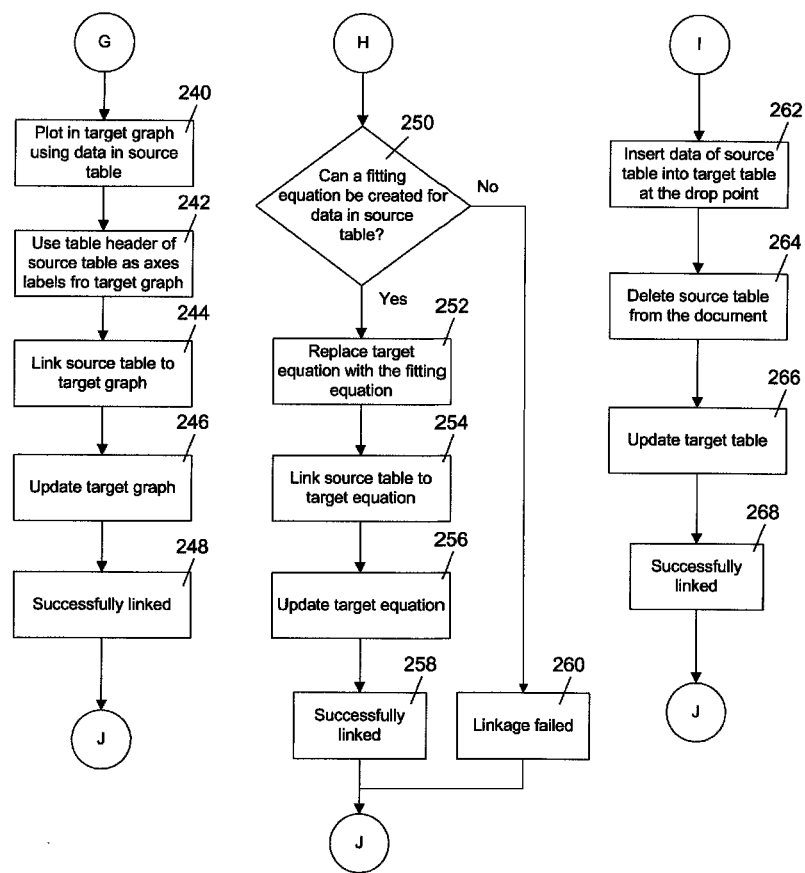

FIG. 8D illustrates the general steps of linking the source and target objects when the type of the source object is a table. If the type of the target object is a graph, the processing structure branches to the process at connector G. The processing structure first generates a chart for the target object by using the data in the source table object, and replaces any chart in the target object with the graph generated using the data in the source table object (step 240). The respective axis labels of the generated chart are set by using the table headers of the source table object (step 242). Then, a link between the source and target objects is created (step 244), and the target object is updated to shown the chart of the source table (step 246). After setting a "Successfully linked" message (step 248), the process branches via connector J to step 138 (see FIG. 8A), i.e., ending the step 90 (see FIG. 7) with the "Successfully linked" message.

If the type of the target object is an equation/formula, the processing structure branches to the process at connector H. The processing structure first checks whether a fitting function that best fits the data in the source table object can be created (step 250). If such a fitting function cannot be created, the processing structure sets a "Linkage failed" message (step 260) and branches via connector J to step 138 (see FIG. 8A), i.e., ending the step 90 (see FIG. 7) with the "Linkage failed" message.

If at step 250, it is determined that a fitting function can in fact be created, the processing structure creates the fitting function by using, for example, a spline function, a Bessel function, or other appropriate functions or analysis methods, and replaces the target equation object with the new fitting function (step 252). A link between the source table object and the target equation object is then established (step 254). The target equation object is updated to shown the new fitting function on the graphical user interface (step 256). After that, a "Successfully linked" message is set (step 258) and the process branches via connector J to step 138 (see FIG. 8A), i.e., ending the step 90 (see FIG. 7) with the "Successfully linked" message.

If the type of the target object is also a table, the processing structure branches to the process at connector I. At step 262, the processing structure inserts the table data of the source table object into the target table object. It is preferred that the data is inserted above the row at which the link indicator has been dropped. Alternatively, the table data of the source table object may simply be appended to the end of the target table, or an option given for the user to choose an insertion point in a dialog box. If the source table object contains more columns than the target table object, the target table is expanded to have the same number of rows as the source table before the data of the source table is inserted into the target table.

After merging the source table object into the target table object, the source object is deleted (step 264). Then, the processing structure updates the target object to display the expanded table on the graphical user interface (step 266). After setting a "Successfully linked" message (step 268), the process branches via connector J to step 138 (see FIG. 8A), i.e., ending the step 90 (see FIG. 7) with the "Successfully linked" message.

According to this invention, the source object is merged into the target object if the source and target objects are of the same type. If the source and target objects are of different types yet have compatible underlying data, the source object is linked to the target object, and a visible link indicator is created between the source and target objects. The link indicator is shown on the graphical user interface when at least one linked object that the link indicator is directly or indirectly associated with is selected, and is hidden when no linked object that the link indicator is directly or indirectly associated with is selected. Thus, the link indicator provides the user with a clear indication of the linkage of the selected object and the objects it links to. The highlight boxes provide further enhancement to the linkage indication.

Figure 9:
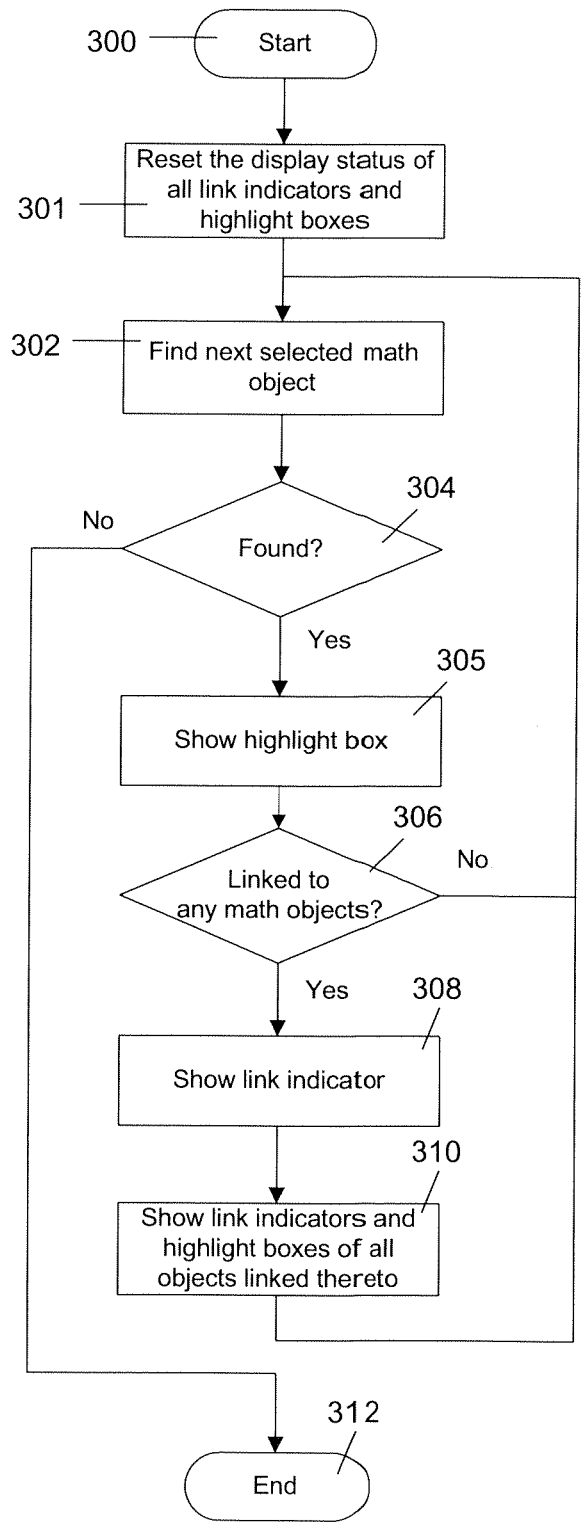
FIG. 9 is a flowchart showing the steps performed by the processing structure for updating the displaying status of link indicators.

FIG. 9 illustrate the general steps for updating the display of link indicators and highlight boxes. When the process starts (step 300), the processing structure resets the display status of all link indicators and highlight boxes to "hidden" (step 301). Then, the processing structure finds a mathematical object that is selected by the user (step 302). If such an object is not found (step 304), the process ends (step 312), so that no link indicators or highlight box are shown on the graphical user interface. If such an object has been selected (step 304), the processing structure shows the highlight box around it (step 305), and then checks whether the object has been linked to any other mathematical objects (step 306). If the selected object has not been linked to any other mathematical object, the process branches back to step 302 to find the next selected mathematical object; otherwise, the processing structure updates the display to show the link indicator associated to the selected object (step 308). Then, the processing structure finds all objects linked to the selected object directly or indirectly (i.e., via other mathematical objects), and shows the corresponding link indicators and highlight boxes (step 310). The process then loops back to step 302 to find the next object selected by the user.

Figure 10A:
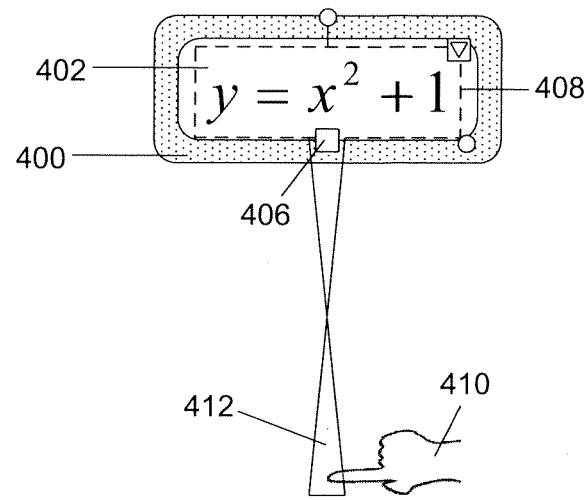
FIGS. 10A and 10B are illustrations of the graphical user interface when an equation object is linked to a table object.
Figure 10B:
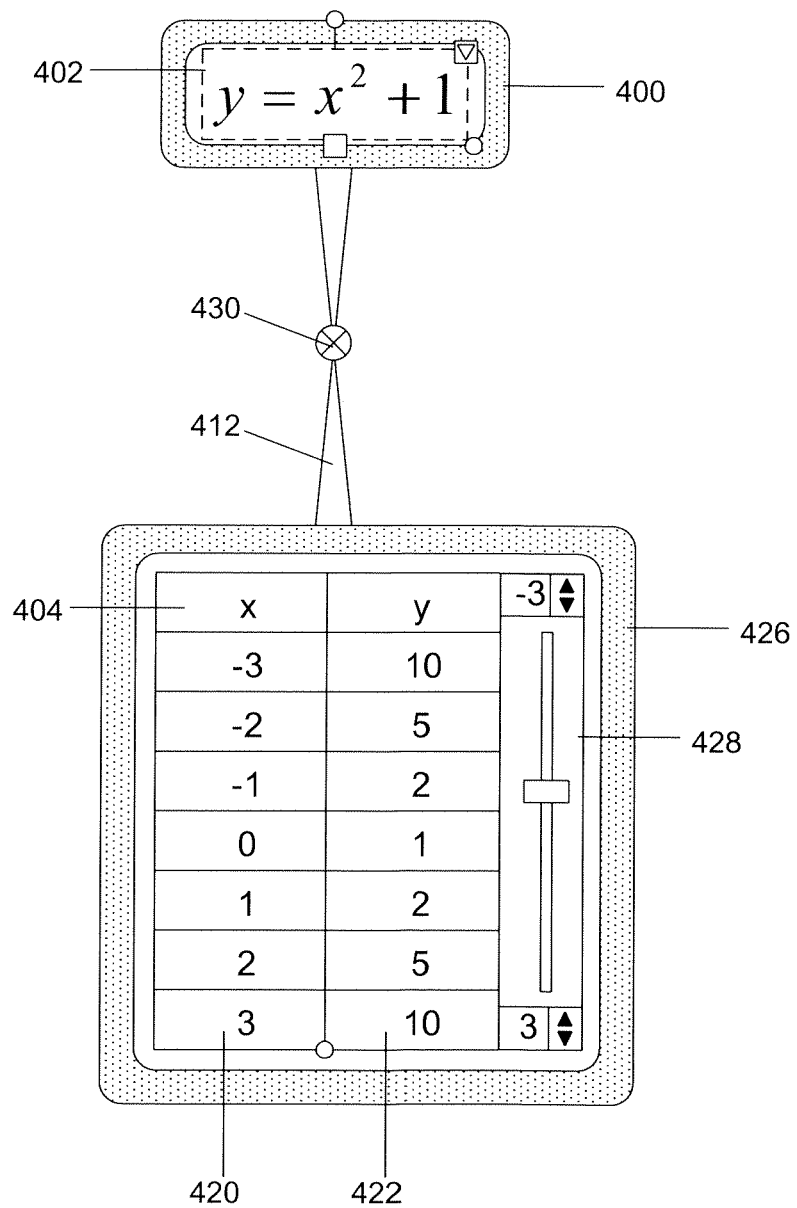

FIGS. 10A and 10B illustrate establishing a link between an equation object 402 and a table object 404. In FIG. 10A, the equation object 402 is selected. Therefore, the equation object 402 is highlighted with the highlight box 400 and the dash-line border 408, together with the control handles (i.e., the rotation handle, scaling handle and context menu) as described before. A link handle 406 is also caused to appear on the dash-line border 408. When the user drags the link handle 406 by using a pointer 410, a link indicator 412 is created and caused to appear on the graphical user interface.

The link indicator 412 originates from the equation object 402 or its proximity and extends along the movement of the pointer 410.

In FIG. 10B, after the user drops the link indicator 412 on the table object 404, the link indicator 412 connects to the table object 404 and a link removal button 430 is added to the link indicator. A link between the equation object 402 and the table object 404 is created, and the table object 404 is updated. When sampling the equation object 402 to obtain data for the table object 404, the samples of variable x are obtained from the first column 420 of the table object 404. The samples of the dependent variable y are calculated by applying each of the samples of variable x to the equation of the equation object 402 and calculating the function value. The calculated values of the dependent variable y are filled into the second column 422 of the table object 404. The table object 404 is highlighted by the highlight box 426. In addition, a table control panel 428 is attached to the table object 404. The table control panel 428 is used to adjust the data in the table object 404.

Figure 11A:
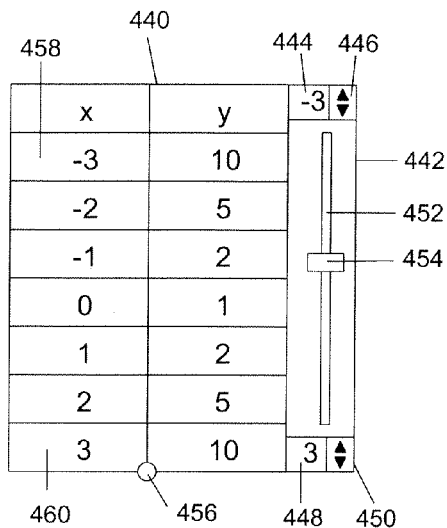
FIGS. 11a to 11d illustrate the table control panel attached to a table.

FIGS. 11A to 11D better illustrate a table object 440 having a table control panel 442. As shown in FIG. 11A, the table control panel 442 comprises a first input box 444, a first spin button 446, a second input box 448, a second spin button 450, and a slider 452 having a slide handle 454. The user may input a number into the first input box 444, use the first spin button 446 to increment/decrement the number in the first input box 444, input a number into the second input box 448, or use the second spin button 450 to increment/decrement the number in the second input box 448. The user may also drag the slide handle 454 towards the first input box 444 to decrease the numbers in the first and second input boxes 444 and 448 with the same amount, or drag the slide handle 454 towards the second input box 448 to increase the numbers in the first and second input boxes 444 and 448 with the same amount. A series-resizing handle 456 is also added to the border of the table.

In FIG. 11A, the table control panel 442 is attached in a vertical direction at the right side of the table 440. However, the user may drag the table control panel 442 to the left side of the table 440. The user may also drag the table control panel 442 to the top or bottom of the table 440 so that the table control panel 442 is oriented in a horizontal direction. When the table control panel 442 is oriented in a vertical direction, the processing structure uses the first column of the table 440 as the series of variable x, and uses the second column as the series of the dependent variable y. The data in the top cell of each column is used as the name of the series if the data in the top cell is a non-numerical string; otherwise, it is deemed as a part of the series. When the table control panel 442 is oriented in a horizontal direction, the processing structure uses the first row of the table 440 as the series for variable x, and uses each of the other rows as the series for the function y. The data in the leftmost cell of each row is used as the name of the series if the data in the leftmost cell is a non-numerical string; otherwise, it is deemed as a part of the series.

Figure 11B:
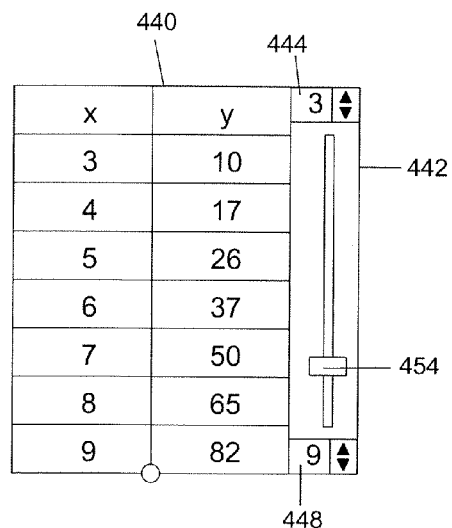

When the table control panel is created and attached to the table object 440, the number in the input boxes 444 and 448 are equal to numbers in the first and last data cells 458 and 460 in the series of variable x, respectively. As illustrated in FIG. 11b, when the user drags the slide handle 454 towards the second input box 448 to simultaneously change the values in the input boxes 444 and 448 with the same amount, the series of variable x are also changed. The first and last values $x_0$ and $x_{n-1}$ in the series of variable x are equal to the values in the first and second input boxes 444 and 448, respectively. Other values in the series of variable x are determined as shown in Equation 1, below:

$$x_k = x_0 + k(x_{n-1} - x_0)/(n-1) \quad \text{(Equation 1)}$$

where:

k=0, . . . , n−1; and n is the length of the series (excluding the header).

After the series of variable x is updated, the series of the function y is recalculated in a similar manner as has been set out above.

Figure 11C:
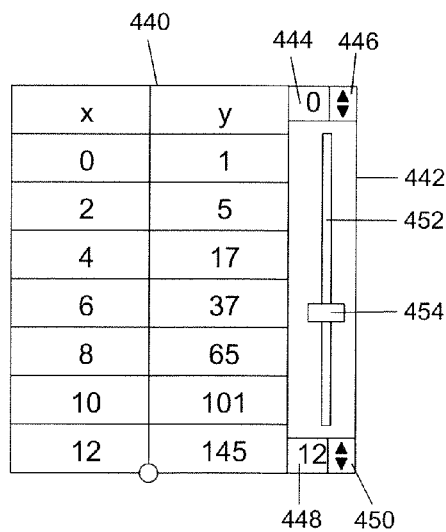

The value of the input box 444 can be independently changed by inputting a number into the input box 444 or by using the spin button 446. The value of the input box 448 can be independently changed by inputting a number into the input box 448 or by using the spin button 450. FIG. 11C shows that the user changed the values of the first and second input boxes 444 and 448 to 0 and 12, respectively. The series of variable x in the first column of the table object 440 are also updated by using Equation 1. After the series of variable x are updated, the series of the function y are recalculated.

Figure 11D:
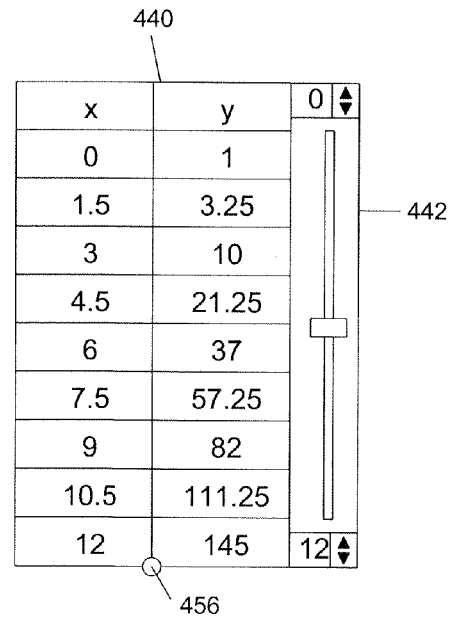

Referring to FIGS. 11C and 11D, the length of the series (i.e., the number of rows, excluding the header, in FIGS. 11C and 11D) can be changed by dragging the series-resizing handle 456. Comparing FIG. 11C to 11D, while the range of the series of variable x remains the same (i.e., from 0 to 12), the length of the series is changed from 7 (i.e., 7 rows) to 9 (i.e., 9 rows). Therefore, the series of variable x are updated by using Equation 1. After the series of variable x are updated, the series of the function y are recalculated.

Figure 12A:
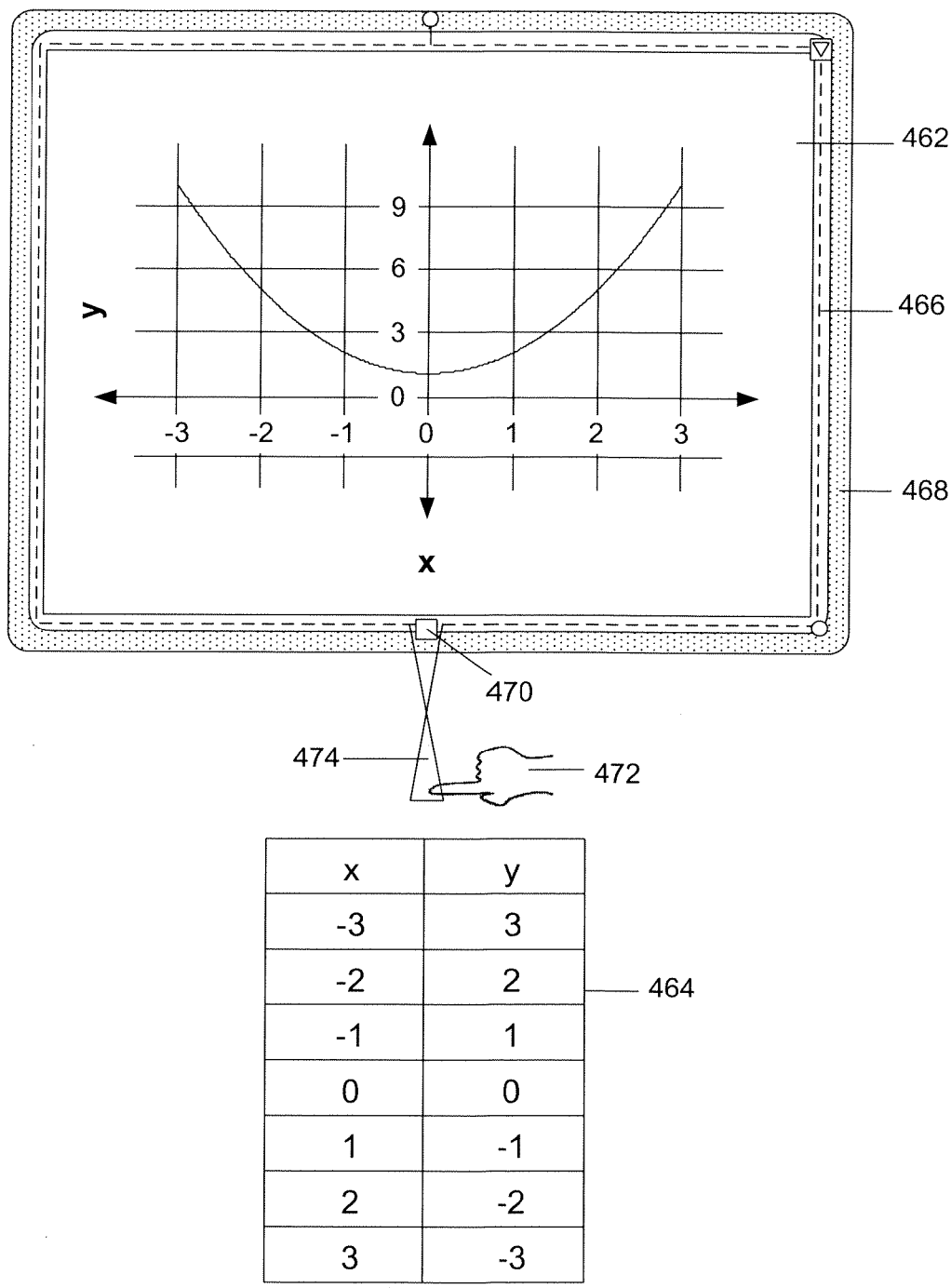
FIGS. 12A and 12B are illustrations of the graphical user interface when a graph object is linked to a table object.
Figure 12B:
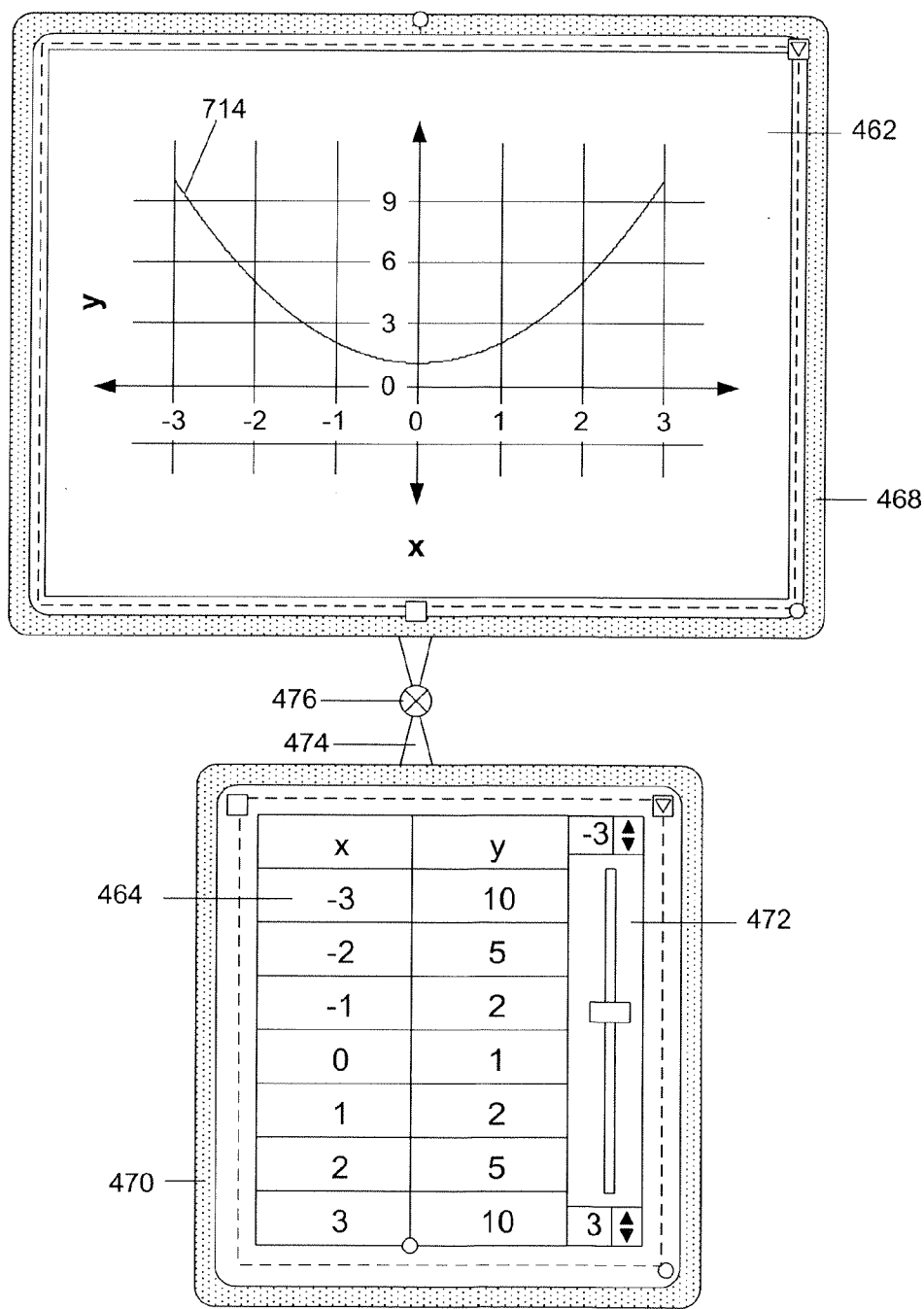

FIGS. 12A and 12B illustrate establishing a link between a graph object 462 and a table object 464. In FIG. 12A, the graph object 462 is selected. Therefore, it is highlighted with the dash-line border 466 and the highlight box 468, together with the control handles as described before. A link handle 470 is also shown on the dash-line border 466. When the user drags the link handle 470 by using a pointer 472, a link indicator 474 is created and shown on the graphical user interface. The link indicator 474 originates from the graph object 462 or its proximity and extends along the movement of the pointer 472.

In FIG. 12B, after the user drops the link indicator 474 on the table object 464, the link indicator 474 connects to the table object 464 and a link removal button 476 is added to the link indicator 474. A link between the graph object 462 and the table object 464 is created, and the table object 464 is updated. When sampling the graph object 462 to obtain data for the table object 464, the sample values of the x-axis in the graph object 462 are obtained from the first column of the table object 464. The second column of the table object 464 is filled with the values of the curve 714 corresponding to the sample values of the x-axis in the graph object 462. The table object 464 is highlighted by the highlight box 470. In addition, a table control panel 472 is attached to the table to allow the user to adjust the values in the first column and obtain the corresponding values of the curve.

Figure 13A:
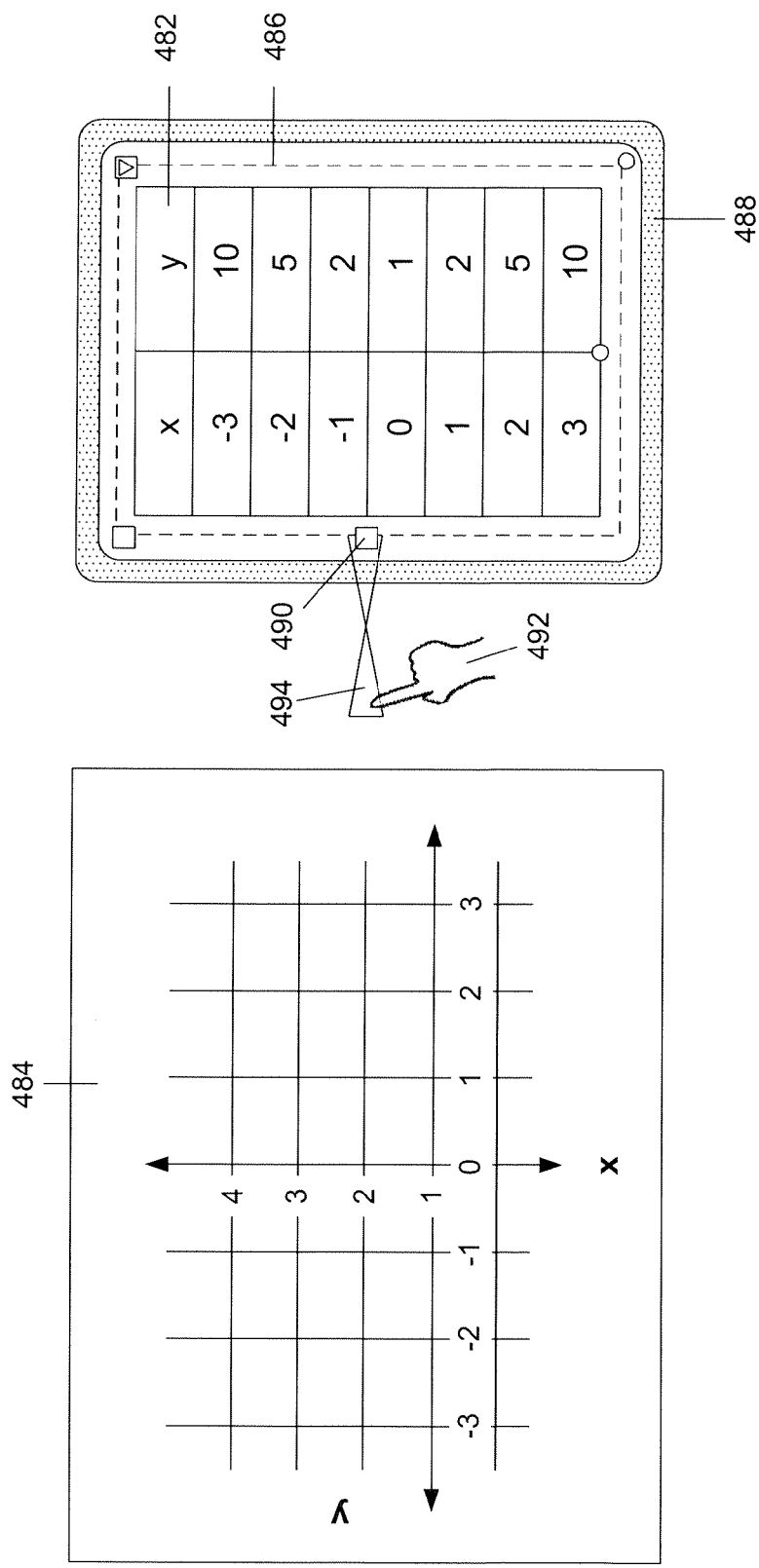
FIGS. 13A and 13B are illustrations of the graphical user interface when a table object is linked to a graph object.
Figure 13B:
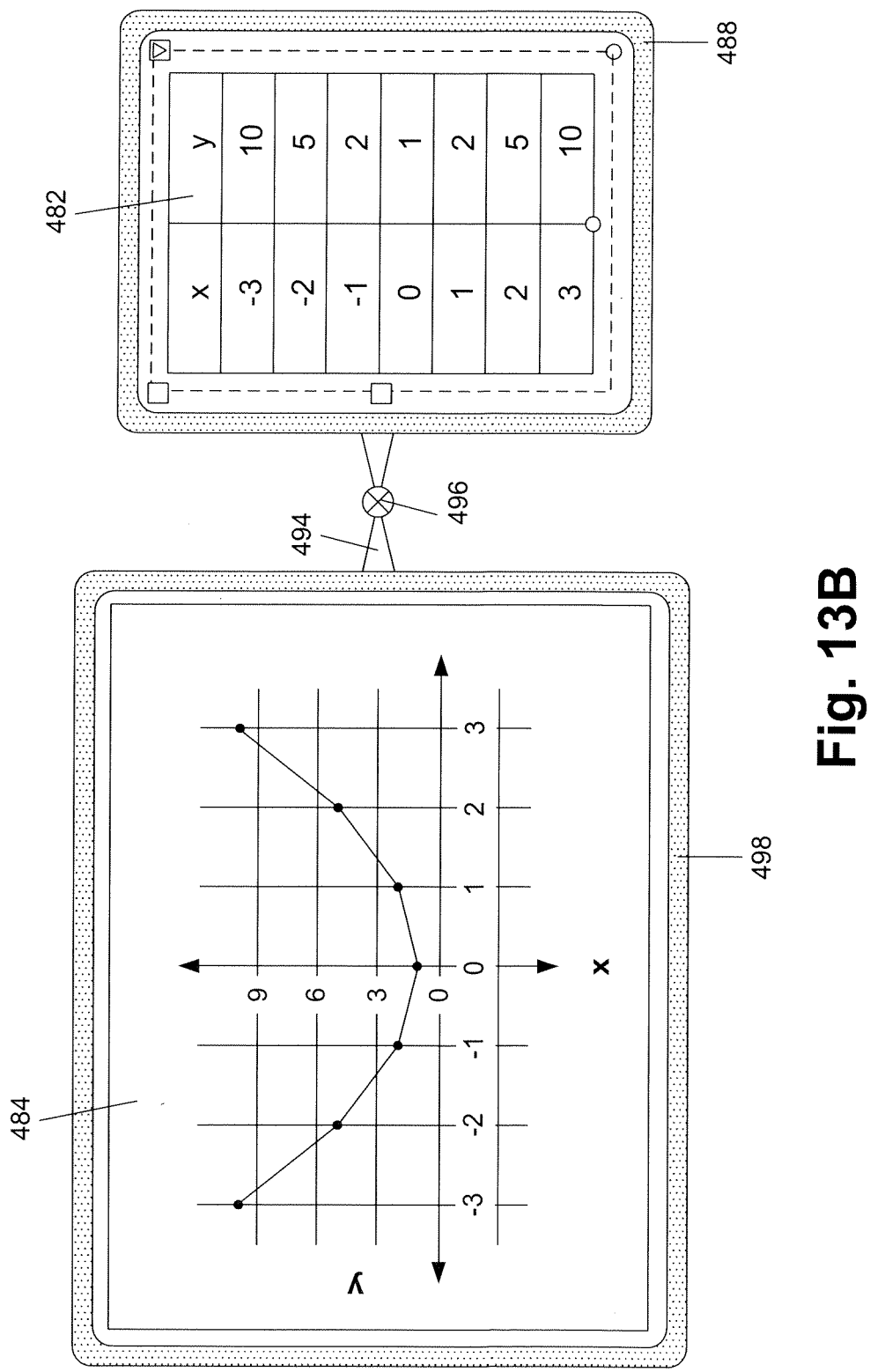

FIGS. 13A and 13B illustrate establishing a link between a table object 482 and a graph object 484. In FIG. 13A, the table object 482 is selected. Therefore, it is highlighted with the dash-line border 486 and the highlight box 488, together with the control handles as described before. A link handle 490 is shown on the dash-line border 486. When the user drags the link handle 490 by using a pointer 492, a link indicator 494 is created and shown on the graphical user interface. The link indicator 494 originates from the table object 482 or its proximity and extends along the movement of the pointer 492.

In FIG. 13B, after the user drops the link indicator 494 on the graph object 484, the link indicator 494 connects to the graph object 484 and a link removal button 496 is added to the link indicator 494. A link between the table object 482 and the graph object 484 is created, and the graph object 484 is updated to display a line chart based on the data in the table object 482. The graph object 484 is highlighted by the highlight box 498.

Figure 14A:
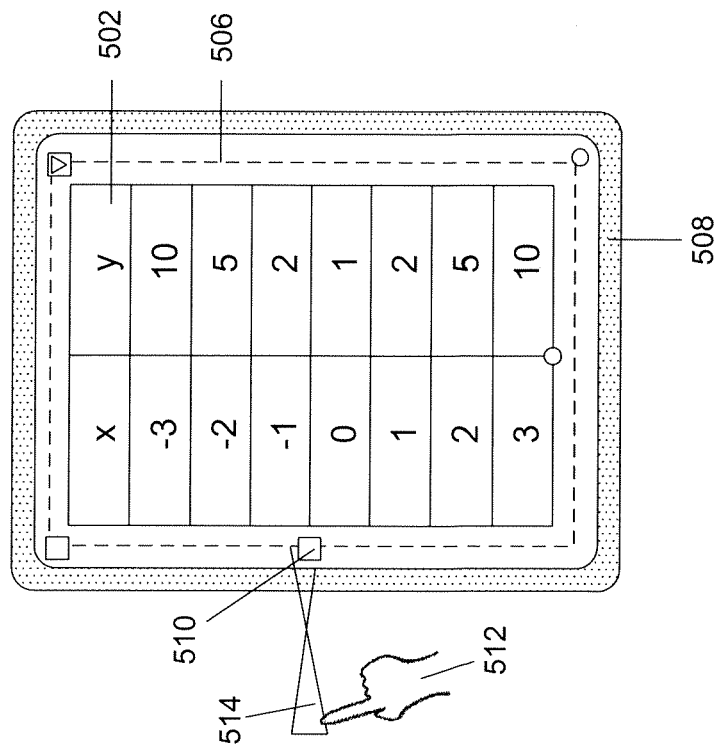
FIGS. 14A and 14B are illustrations of the graphical user interface when a table object is linked to an equation object.
Figure 14B:
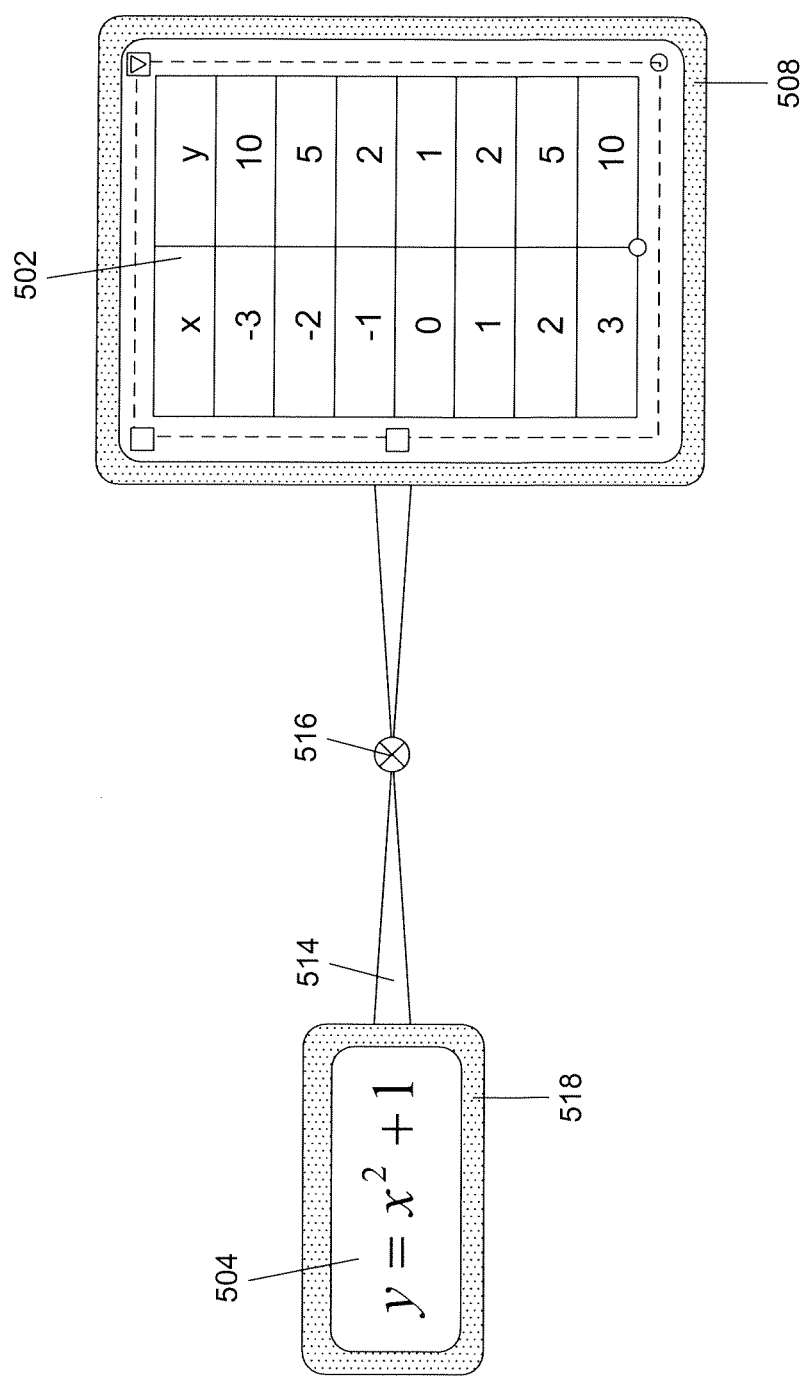

FIGS. 14A and 14B illustrate establishing a link between a table object 502 and an equation object 504. In FIG. 14A, the table object 502 is selected. Therefore, it is highlighted with the dash-line border 506 and the highlight box 508, together with the control handles as described before. A link handle 510 is also shown on the dash-line border 506. When the user drags the link handle 510 by using a pointer 512, a link indicator 514 is created and shown on the graphical user interface. The link indicator 514 originates from the table object 502 or its proximity and extends along the movement of the pointer 512.

In FIG. 14B, after the user drops the link indicator 514 on the equation object 504, the link indicator 514 connects to the equation object 504 and a link removal button 516 is added to the link indicator 514. A link between the table object 502 and the equation object 504 is created. The processing structure determines a best-fit function from the data in the table object 502 by using regression analysis algorithms or other appropriate algorithms, and then updates the equation object 504 to display the obtained best-fit function. The graph object 504 is highlighted by the highlight box 518.

Figure 15A:
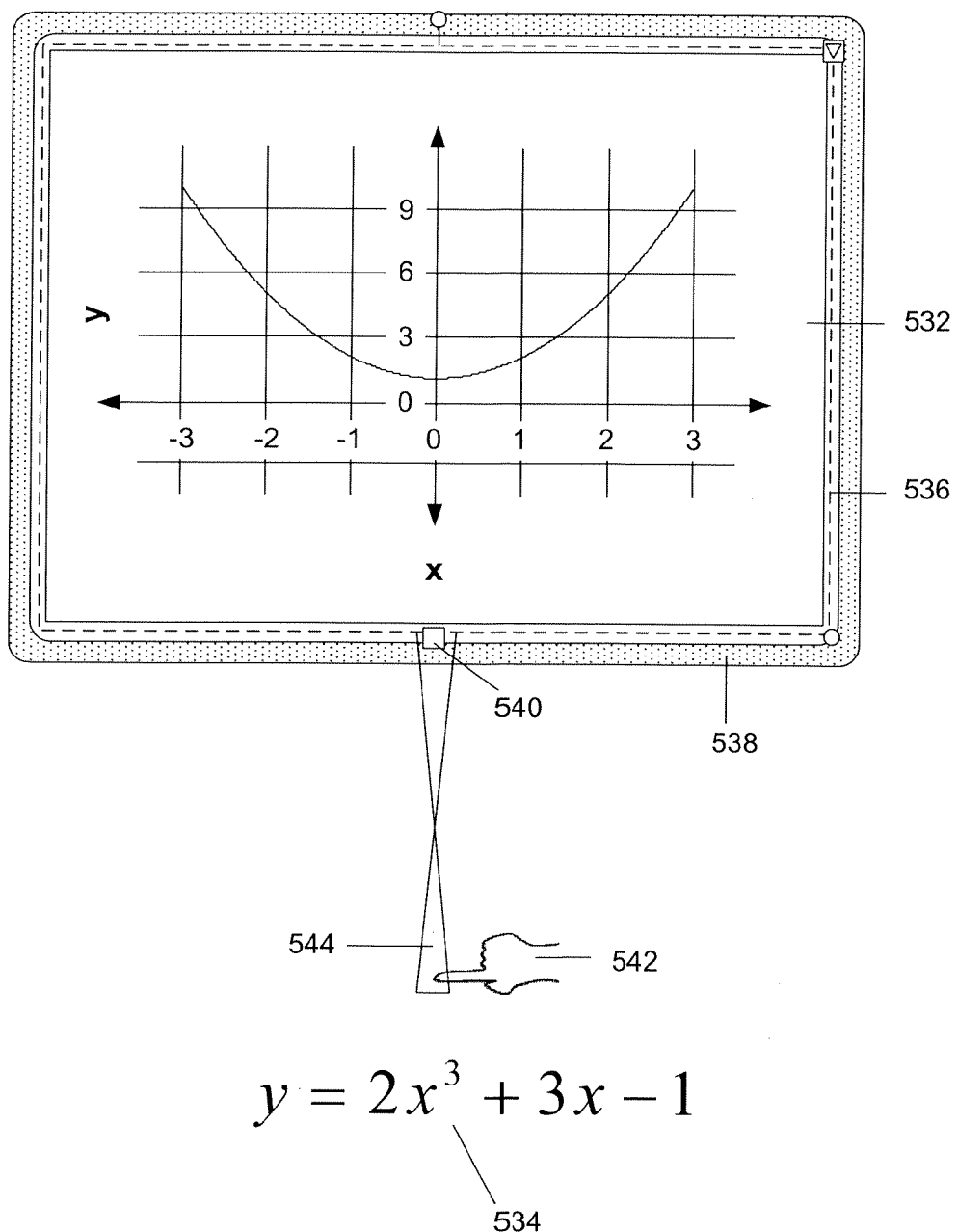
FIGS. 15A and 15B are illustrations of the graphical user interface when a graph object is linked to an equation object.
Figure 15B:
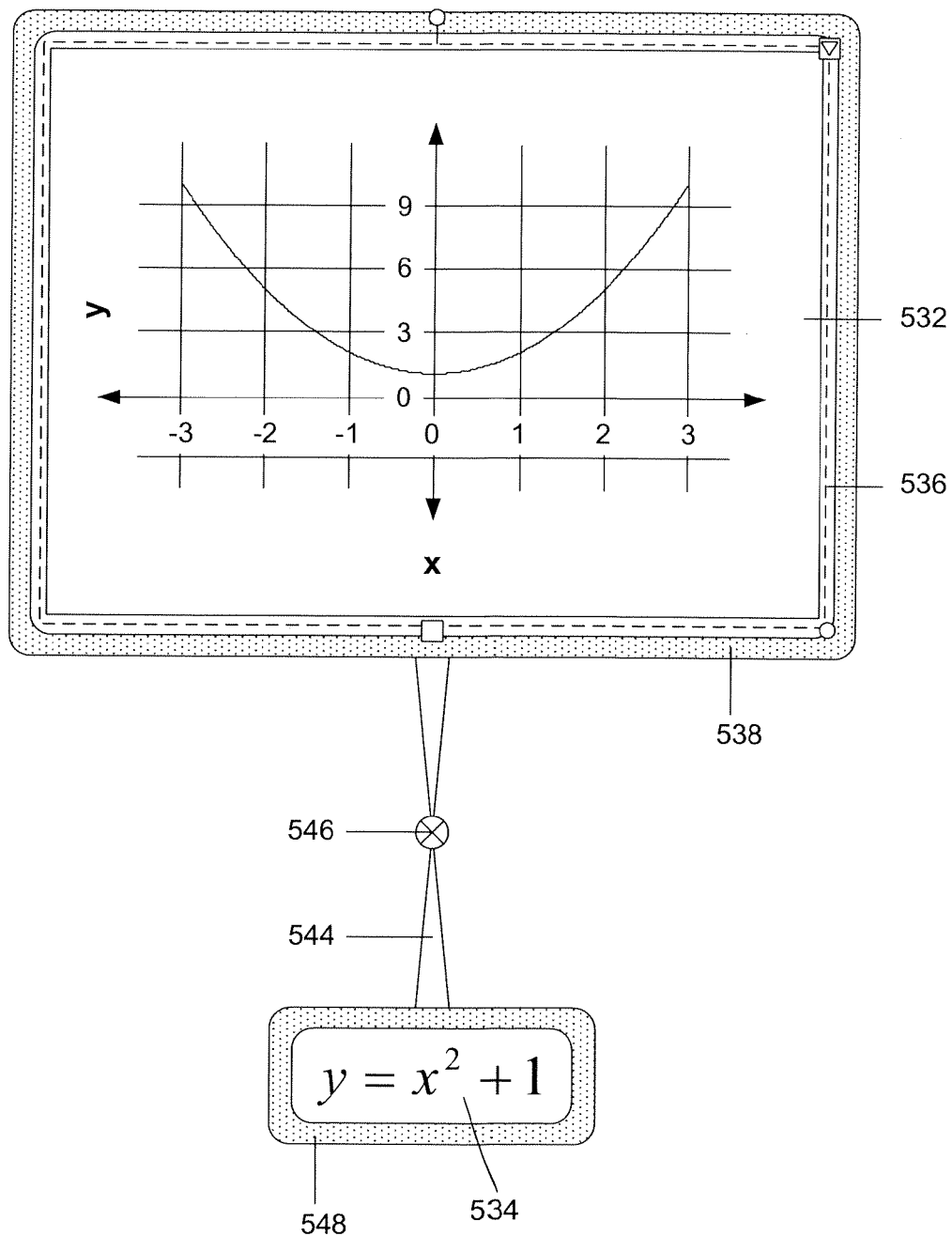

FIGS. 15A and 15B illustrate establishing a link between a graph object 532 and an equation object 534. The graph object 532 comprises at least one curve, which may be generated from a formula or a hand-drawn curve. In FIG. 15A, the graph object 532 is selected. Therefore, it is highlighted with the dash-line border 536 and the highlight box 538, together with the control handles as described before. A link handle 540 is also shown on the dash-line border 536. When the user drags the link handle 540 by using a pointer 542, a link indicator 544 is created and shown on the graphical user interface. The link indicator 544 originates from the graph object 532 or its proximity and extends along the movement of the pointer 542.

In FIG. 15B, after the user drops the link indicator 544 on the equation object 534, the link indicator 544 connects to the equation object 534 and a link removal button 546 is added to the link indicator 544. A link between the graph object 532 and the equation object 534 is created. The processing structure first checks whether the curve in the graph object 532 was generated from an equation. If the curve is generated from an equation, the processing structure updates the equation object 534 to display the equation associated with the curve in the graph object 532. If the curve is hand-drawn, the processing structure determines a formula fitting the curve by using, e.g., a spline function or a Bessel function. Then the processing structure updates the equation object 534 to display the obtained curve-fitting function. The equation object 534 is highlighted by the highlight box 548.

In FIGS. 15A and 15B, the graph object 532 contains only one curve. However, those skilled in the art will readily understand that, when a graph object containing multiple curves is linked to an equation object, a simultaneous equation set will be created in the equation object, where each equation in the simultaneous equation set corresponds to a curve in the graph object 532.

Figure 16A:
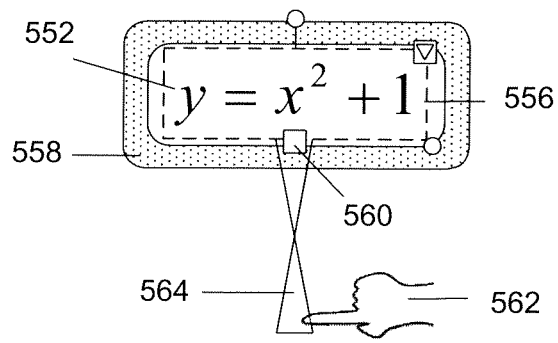
FIGS. 16A and 16B are illustrations of the graphical user interface when an equation object is merged to another equation object.
Figure 16B:
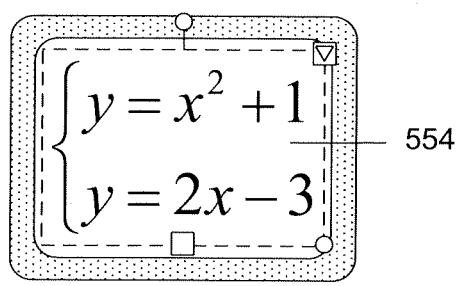

According to this invention, a mathematical object can be related to another object of the same type. FIGS. 16A and 16B show an exemplary illustration where a first equation object 552 is related to a second equation object 554. In FIG. 16A, the first equation object 552 is selected. Therefore, it is highlighted with the dash-line border 556 and the highlight box 558, together with the control handles as described before. A link handle 560 is also shown on the dash-line border 556. When the user drags the link handle 560 by using a pointer 562, a link indicator 564 is created and shown on the graphical user interface. The link indicator 564 originates from the first equation object 552 or its proximity and extends along the movement of the pointer 562.

After the user drops the link indicator 564 on the second equation object 554, the processing structure merges the equation in the first equation object 552 into the second equation object 554 and form a simultaneous equation set in the second equation object 554. The first equation object 552 is then deleted. The processing structure sets the selection status of the updated equation object 554 from "unselected" to "selected", and updates the display (see FIG. 16B).

Figure 17A:
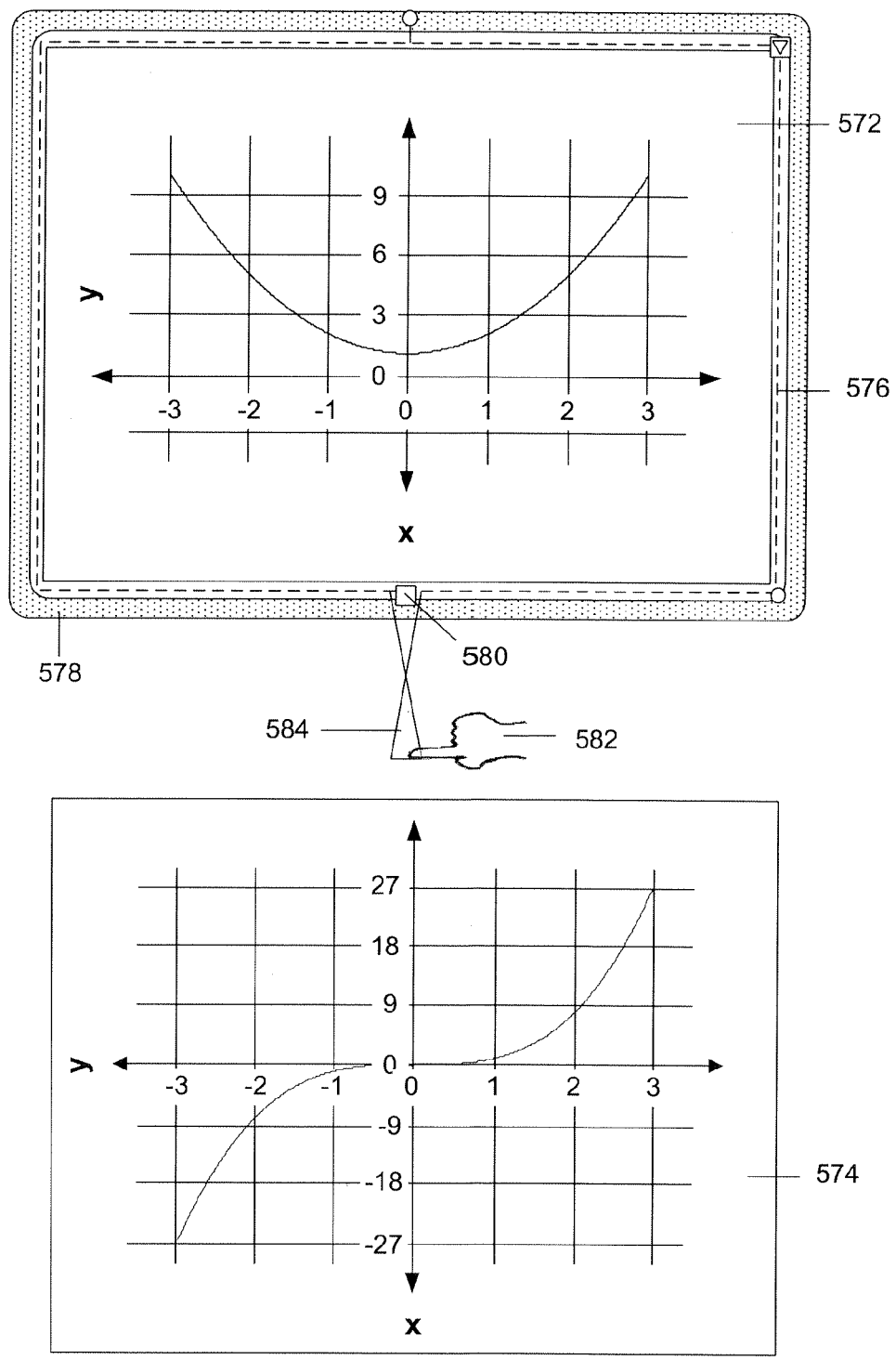
FIGS. 17A and 17B are illustrations of the graphical user interface when a graph object is merged to another graph object.
Figure 17B:
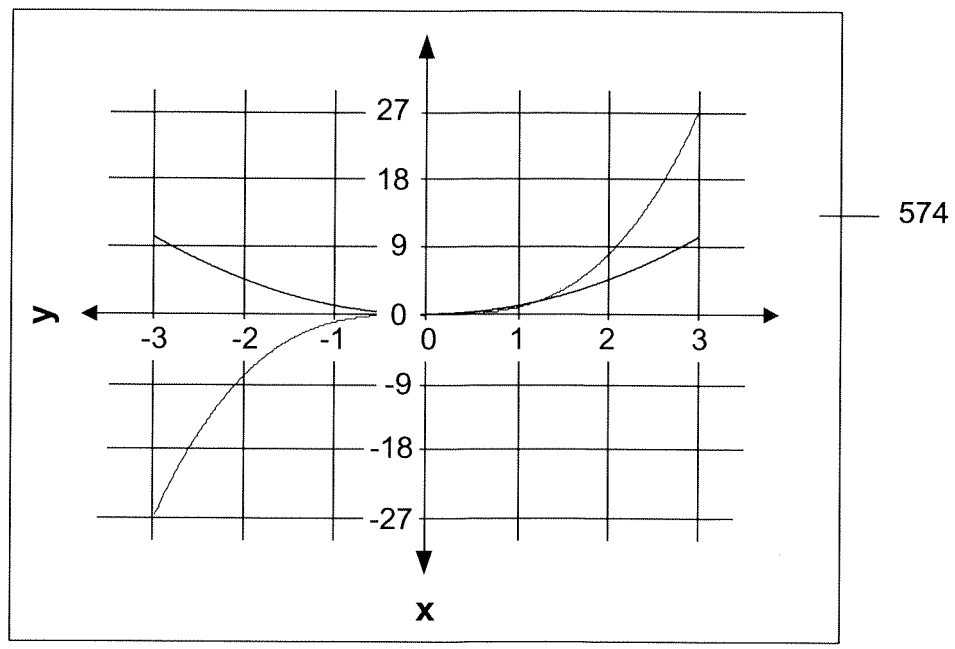

FIGS. 17A and 17B show another exemplary illustration where a first graph object 572 is related to a second graph object 574. In FIG. 17A, the first graph object 572 is selected. Therefore, it is highlighted with the dash-line border 576 and the highlight box 578, together with the control handles as described before. A link handle 580 is also shown on the dash-line border 576. When the user drags the link handle 580 by using a pointer 582, a link indicator 584 is created and shown on the graphical user interface. The link indicator 584 originates from the first graph object 572 or its proximity and extends along the movement of the pointer 582.

After the user drops the link indicator 584 on the second graph object 574, the processing structure merges the graph(s) in the first graph object 572 into the second graph object 574. The first graph object 572 is then deleted. As shown in FIG. 17B, the updated graph object 574 now contains two curves. In this example, the processing structure does not change the status of the updated graph object 574. Thus, the updated graph object 574 remains unselected.

Figure 18A:
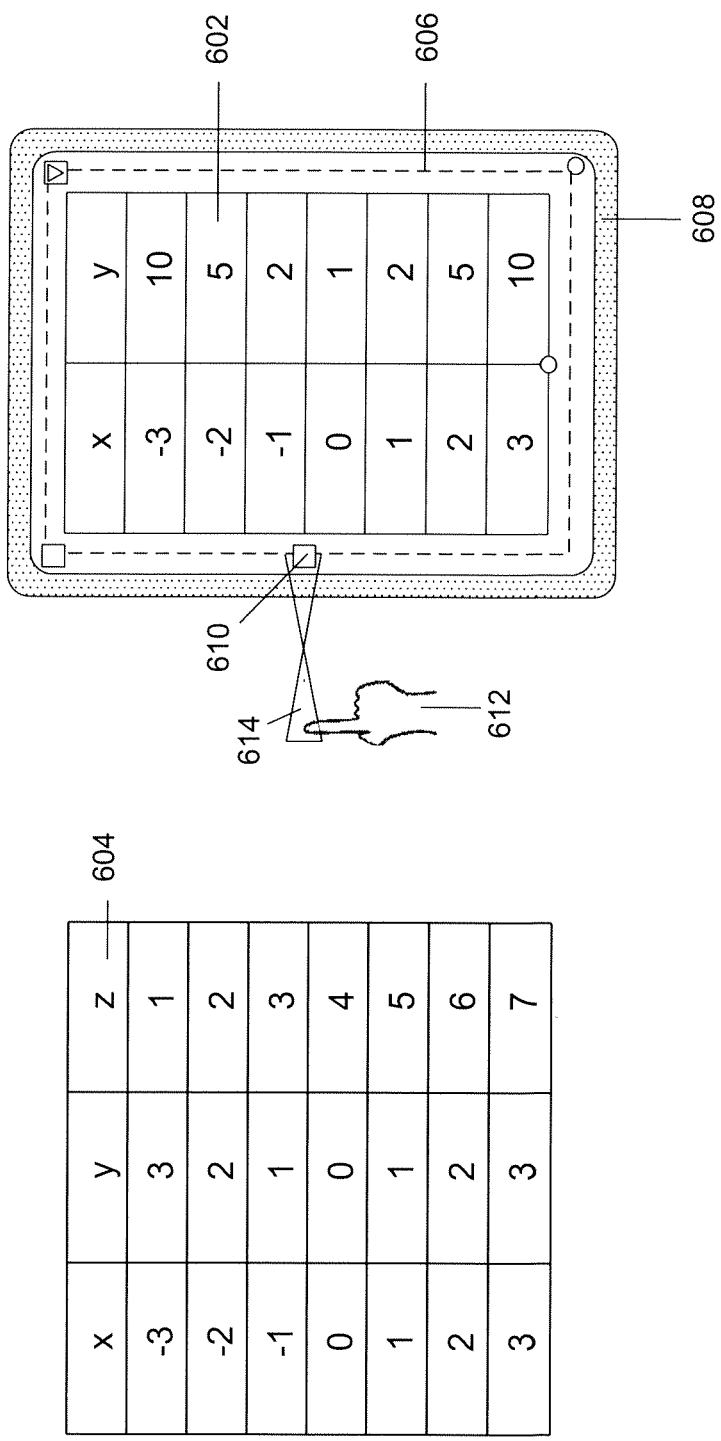

FIGS. 18A and 18B show yet another exemplary illustration where a first table object 602 is related to a second table object 604. In FIG. 18A, the first table object 602 is selected. Therefore, it is highlighted with the dash-line border 606 and the highlight box 608, together with the control handles as described before. A link handle 610 is also shown on the dash-line border 606. When the user drags the link handle 610 by using a pointer 612, a link indicator 614 is created and shown on the graphical user interface. The link indicator 614 originates from the first table object 602 or its proximity and extends along the movement of the pointer 612.

After the user drops the link indicator 614 on the second table object 604, the processing structure determines if the number of columns in the second table object 604 is less than the number of columns in the first table object 602. If so, the processing structure expand the table in the second table object 604 so that the two tables have the same number of columns. Then, the processing structure merges the table in the first table object 602 into the second table object 604. In the example shown in FIG. 18B, the processing structure attaches the table in the first table object 602 to the end of the table in the second table object 604. After the merging operation, the first table object 602 is deleted. The processing structure then sets the selection status of the updated table object 604 to "selected", and updates the display (see FIG. 18B).

Figure 19:
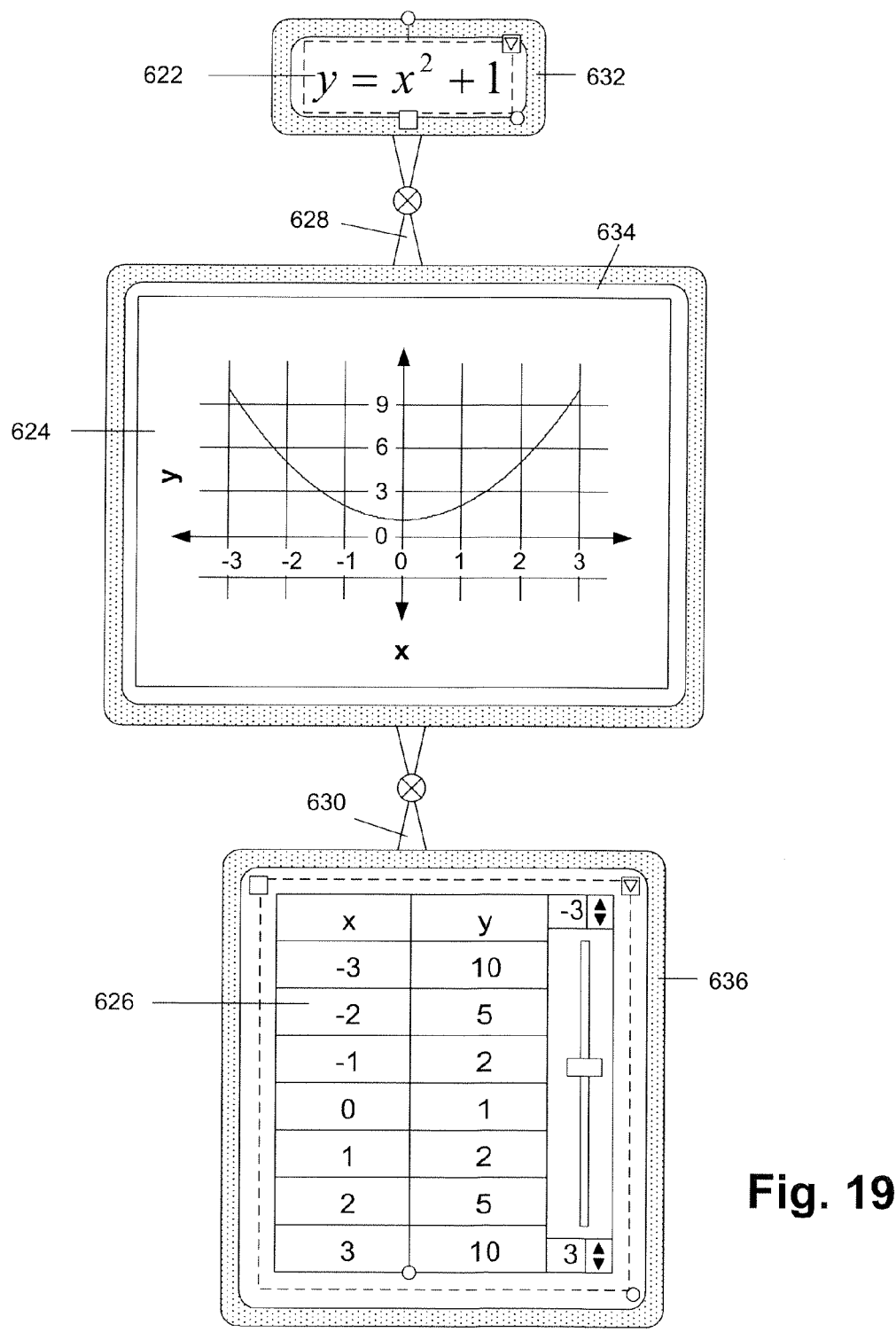
FIG. 19 is an exemplary view of cascaded links of three mathematical objects.

According to this invention, the linkage can be cascaded so that multiple mathematical objects can be linked. FIG. 19 shows an exemplary illustration of cascaded linkage, where an equation object 622 is linked to a graph object 624, and the graph object 624 is linked to a table object 626. The linkage is visually indicated on the graphical user interface by the link indicators 628 and 630, and the highlight boxes 632, 634 and 636.

Figure 20:
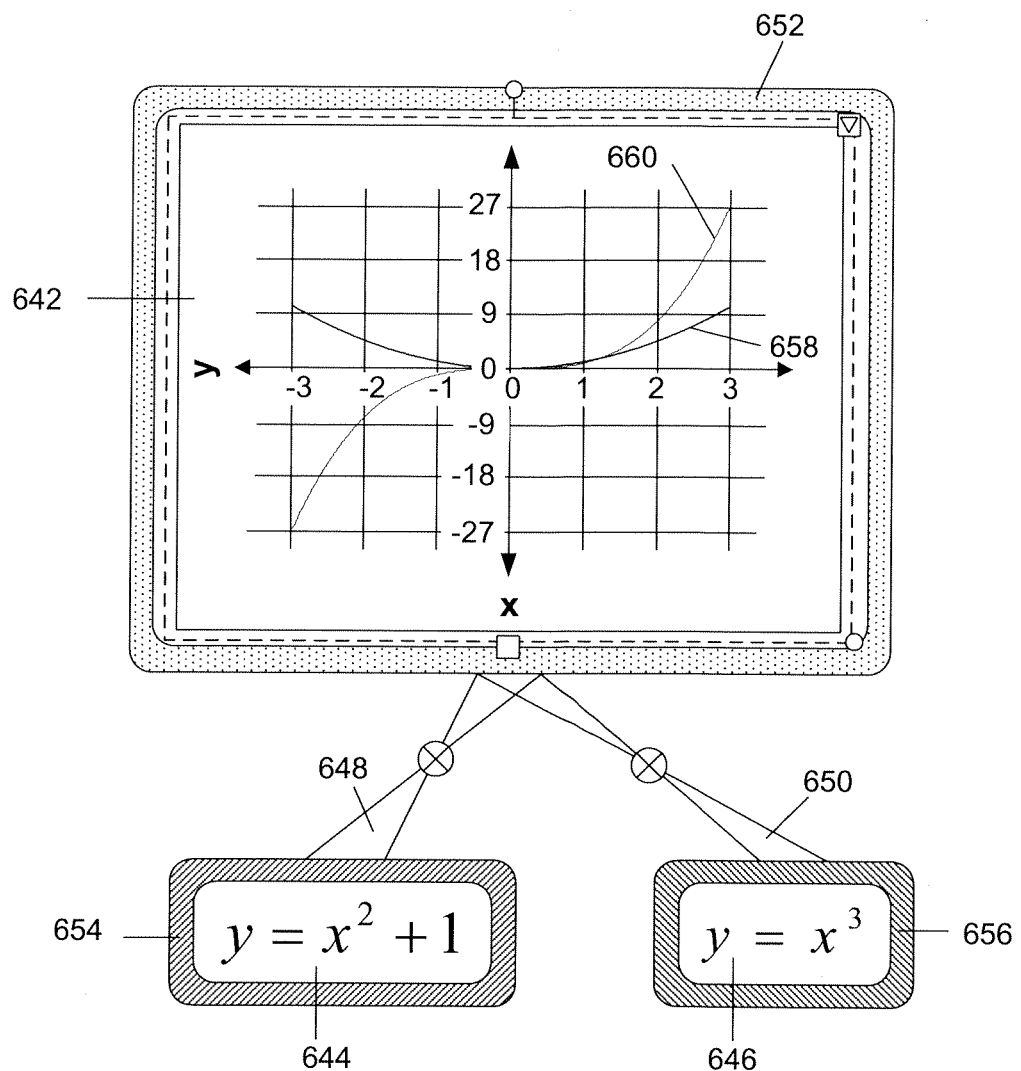
FIG. 20 is an exemplary view of the graphical user interface when a graph object is linked to two equation objects.

FIG. 20 shows another exemplary illustration of cascaded linkage, where a graph object 642 containing two curves is linked to a first equation object 644, and a second equation object 646. The linkage is visually indicated on the graphical user interface by the link indicators 648 and 650, and the highlight boxes 652, 654 and 656. The color of the highlight box 654 matches the color of the curve 658, and the color of the highlight box 656 matches the color of the curve 660 in order to visually associate each equation object to its corresponding curve in the graph object 642.

Figure 21:
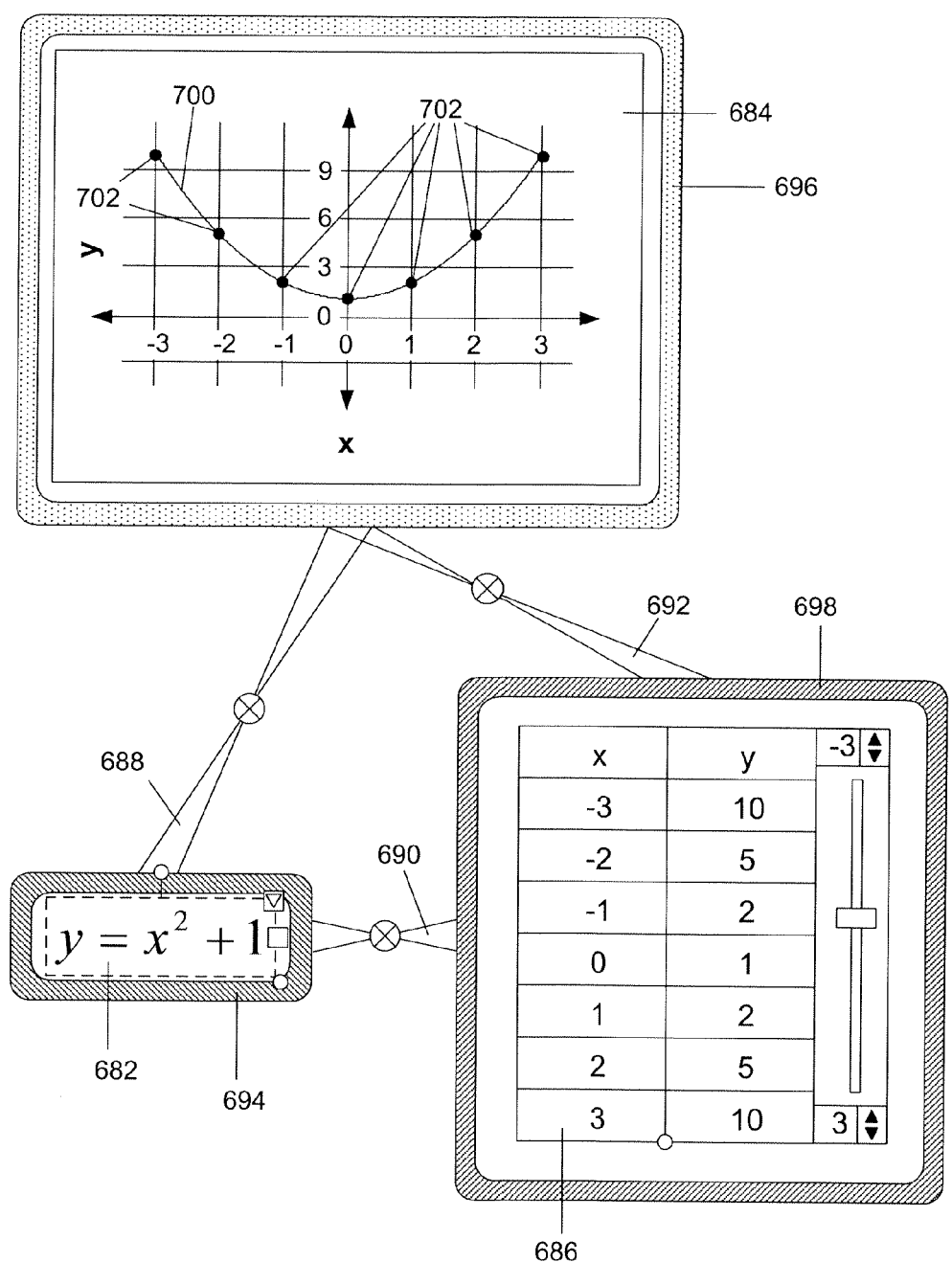
FIG. 21 is an exemplary view of the graphical user interface when the cascaded links of three mathematical objects form a closed loop.

According to this invention, the cascaded linkage among multiple mathematical objects can form a closed-loop. FIG. 21 shows an exemplary illustration of cascaded linkage forming a closed-loop, where an equation object 682 is linked to a graph object 684 and a table object 686, and the table object 686 is also linked to the graph 684. The linkage is visually indicated on the graphical user interface by the link indicators 688, 690 and 692, and the highlight boxes 694, 696 and 698.

In this example, the equation object 682 is linked to the curve 700 in the graph object 684. Therefore, the highlight box 694 of the equation object 682 has the same color with the curve 700 in the graph object 684. The table object 686, which comprises data samples of the equation in the equation object 682, is linked to the points 702 in the graph object 684. Therefore, the highlight box 698 of the table object 686 has the same color with the points 702 in the graph object 684.

Figure 22A:
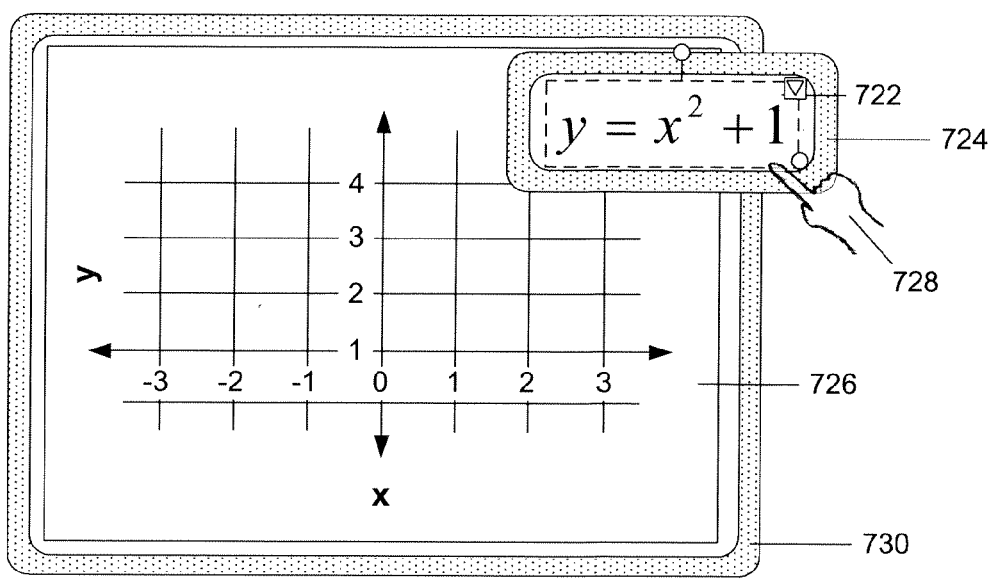
FIGS. 22A and 22B are exemplary illustrations of the graphical user interface when an equation object is linked to a graph object according to an alternative embodiment.
Figure 22B:
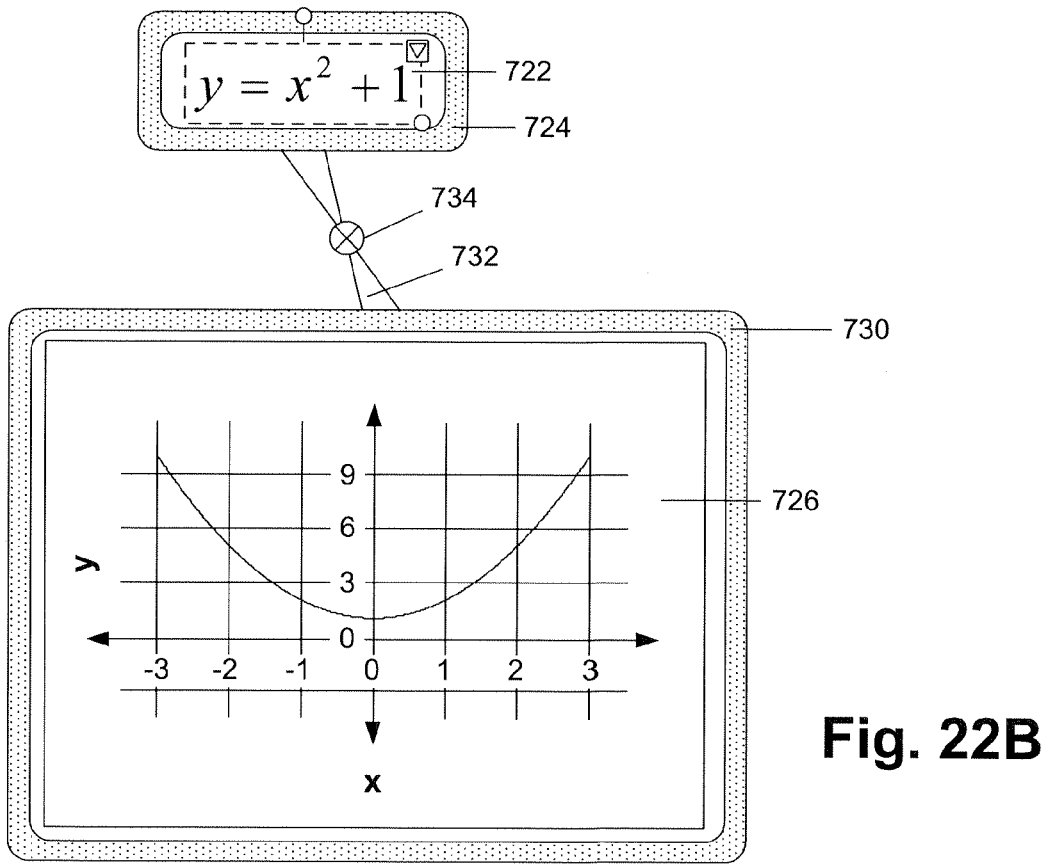

Those of ordinary skill in the art will appreciate that other methods may also be used to establish the link between mathematical objects without departing the spirit of this invention. FIGS. 22A and 22B illustrate an alternative method using drag and drop. In FIG. 22A, the user drags an equation object 722, which is highlighted by a highlight box 724, onto a graph object 726 by using a pointer 728. A highlight box 730 is shown around the graph object 726 when the equation object 722 substantially overlaps with the graph object 726. After the user drops the equation object 722 on the graph object 726, a link between the equation object 722 and the graph object 726 is established. The graph object 726 is updated to display a curve of the equation object 722; the equation object 722 is automatically moved to its original position on the graphical user interface; and a visual link indicator 732 having a link removal button 734 is created between the equation object 722 and the graph object 726, and shown on the graphical user interface. The equation object 722 and the graph object 726 are highlighted by the highlight boxes 724 and 730, respectively.

Figures 23A, 23B:
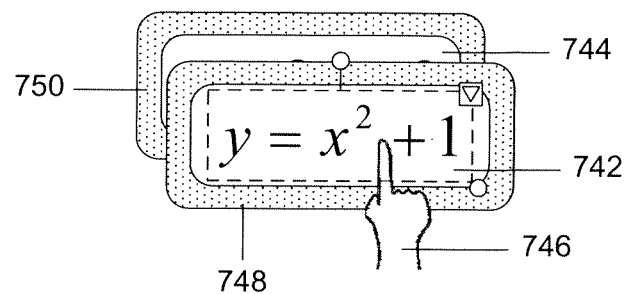
FIGS. 23A and 23B are exemplary illustrations of the graphical user interface when an equation object is merged to another equation object according to an alternative embodiment.

FIGS. 23A and 23B illustrate another example of relating two equation objects. In FIG. 23a, the user drags a first equation object 742 onto a second equation object 744 by using a pointer 746. The first equation object 742 is highlighted with dash-line border and a highlight box 748, together with the control handles as described before. When the first equation object 742 substantially overlaps with the second equation object 744, the second equation object 744 is also highlighted with a highlight box 750. After the user drops the first equation object 742 on the second equation object 744, the equation in the first equation object 742 is merged into the second equation object 744 to form a simultaneous equation set, and then the first equation object 742 is deleted (see FIG. 18B). However, in this example, the updated equation object 744 is not set to "selected".

Figure 24A:
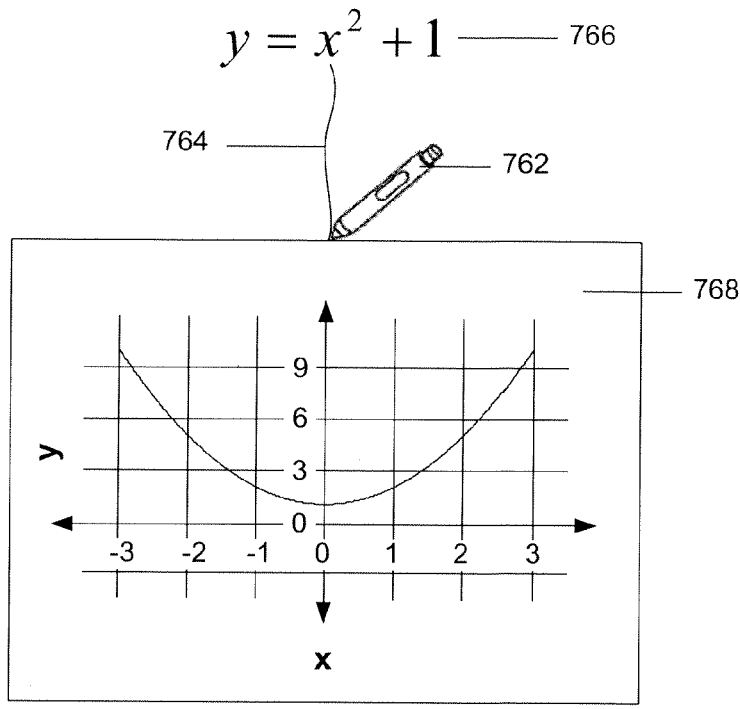
FIGS. 24A and 24B are exemplary illustrations of the graphical user interface when an equation object is linked to a graph object according to yet an alternative embodiment.
Figure 24B:
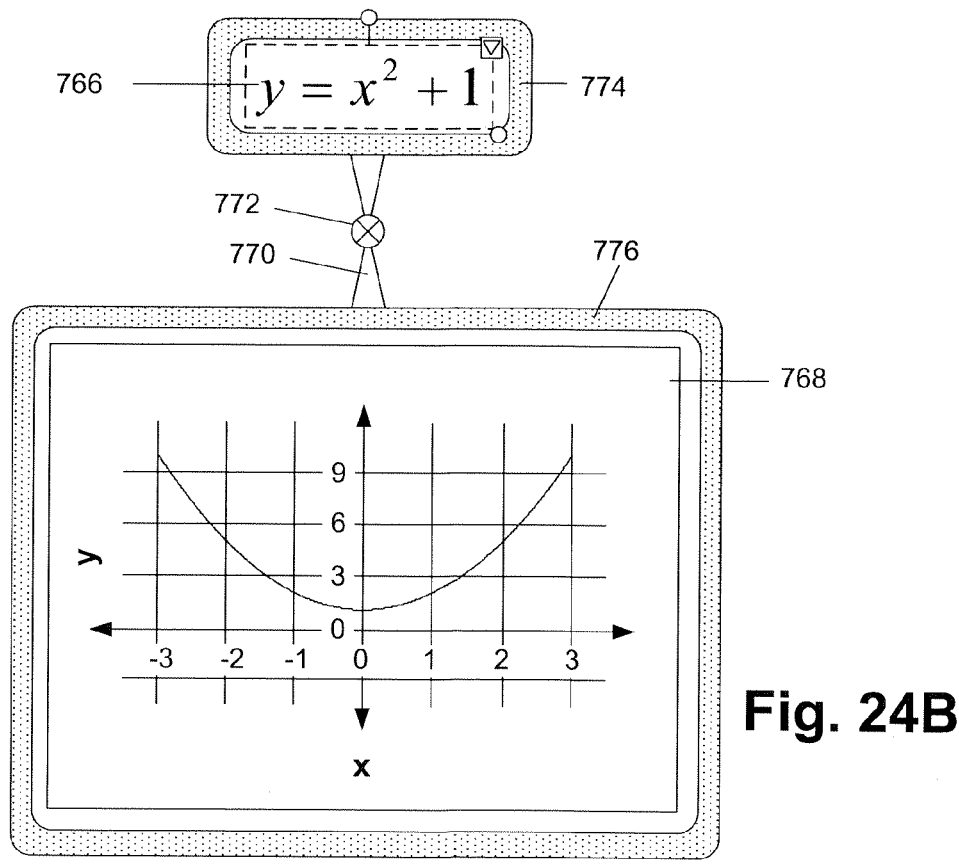

In another embodiment, a link may be established by using a pen to draw a free-form line between two mathematical objects, as illustrated in FIGS. 24A and 24B. In FIG. 24A, the user uses a pen 762 to draw a line 764 from the equation object 766 or its proximity to a graph object 768. Then, as shown in FIG. 24B, a link between the equation object 766 and the graph object 768 is established. The graph object 768 is updated to display a curve of the equation object 766, and a visual link indicator 770 having a link removal button 772 is created between the equation object 766 and the graph object 768, and shown on the graphical user interface. As shown in FIG. 24B, the equation object 766 is set to "selected", and the two objects 766 and 768 are highlighted by the highlight boxes 774 and 776, respectively.

Although in FIGS. 24A and 24B, the link is created by drawing a free-form line. Those skilled in the art will appreciate that a link may also be created by drawing a straight-line, a curve, an arrow, or any other predefined shape from a source object to a target object, establishing the link between the source and target objects and converting the user-drawn shape to a link indicator.

Figure 25A:
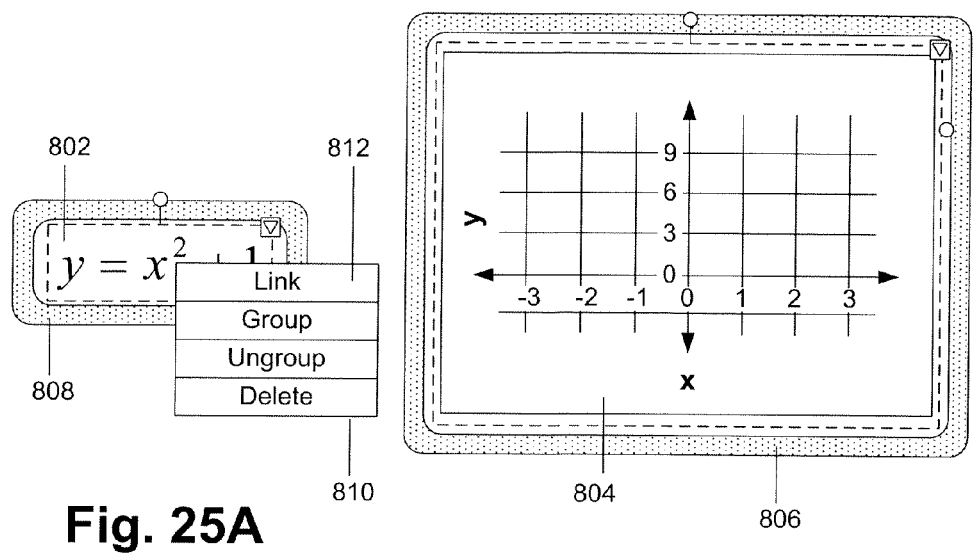
FIGS. 25A and 25B are exemplary illustrations of the graphical user interface when an equation object is linked to a graph object according to yet an alternative embodiment.
Figure 25B:
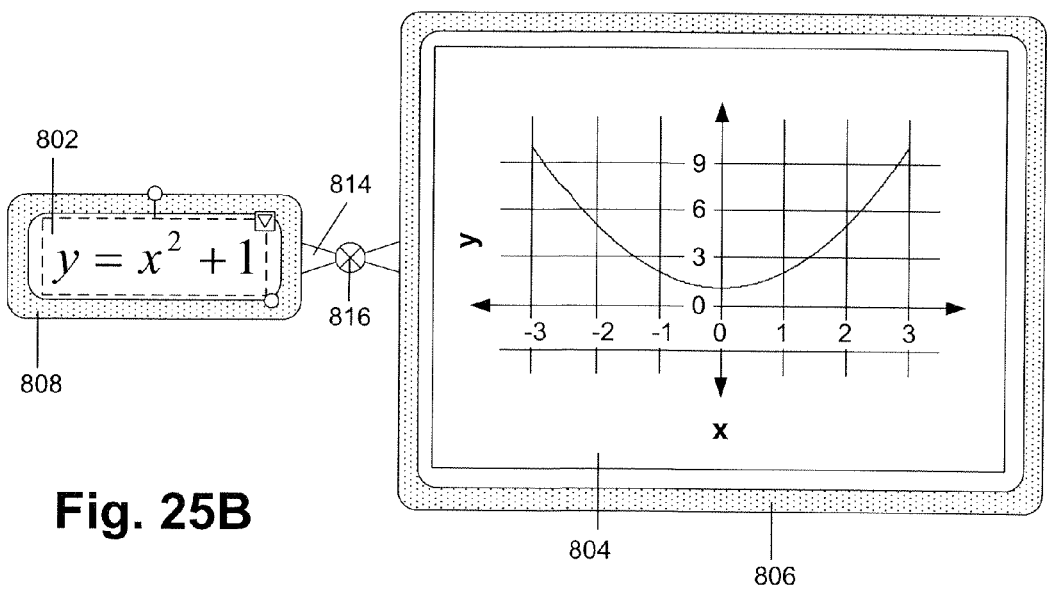

In yet another embodiment, a context menu is used to establish a link between mathematical objects. Shown in FIG. 25A, an equation object 802 and an empty graph object 804 are selected. As described before, they are highlighted by the highlight boxes 806 and 808, respectively. Then, the user right-clicks on any of the two objects to bring a context menu 810, and selects the menu item "Link" 812. The command associated with the menu item "Link" 812 is executed. As a result shown in FIG. 25B, a link is established between the equation object 802 and the graph object 804. Because the graph 804 is empty before the link is established, the graph object 804 is updated based on the equation object 802. A visual link indicator 814 having a link removal button 816 is created between the two objects 802 and 804.

Figure 27A:
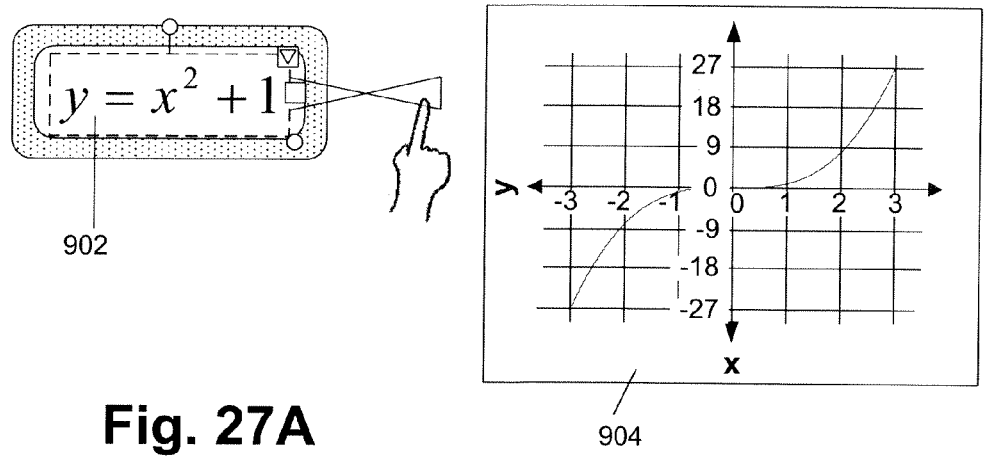
FIGS. 27A and 27B are exemplary illustrations of the graphical user interface when an equation object is linked to a graph object according to still an alternative embodiment.
Figure 27B:
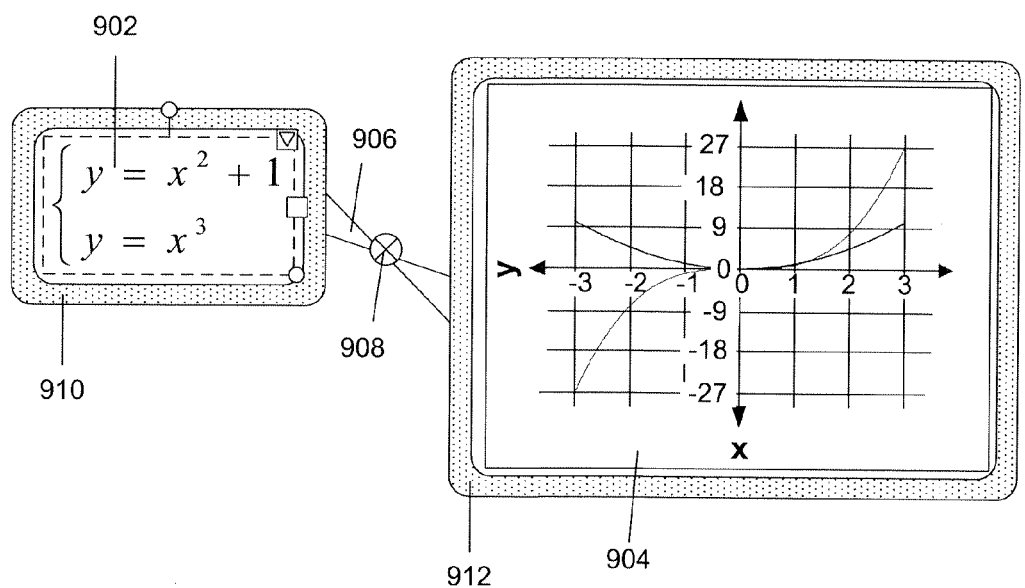

In this embodiment, if the selected mathematical objects are not empty, the data from all objects are combined, and combined data is then updated to all selected mathematical objects, which will be described with more detail later by referring to FIGS. 27A and 27B.

Figure 26A:
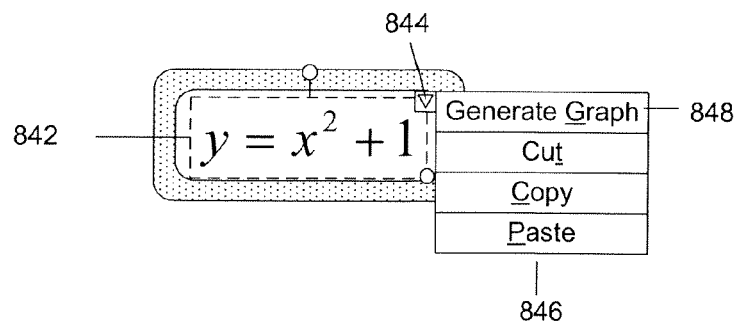
FIGS. 26A and 26B are exemplary illustrations of the graphical user interface when a graph object is created from an equation object according to still an alternative embodiment.
Figure 26B:
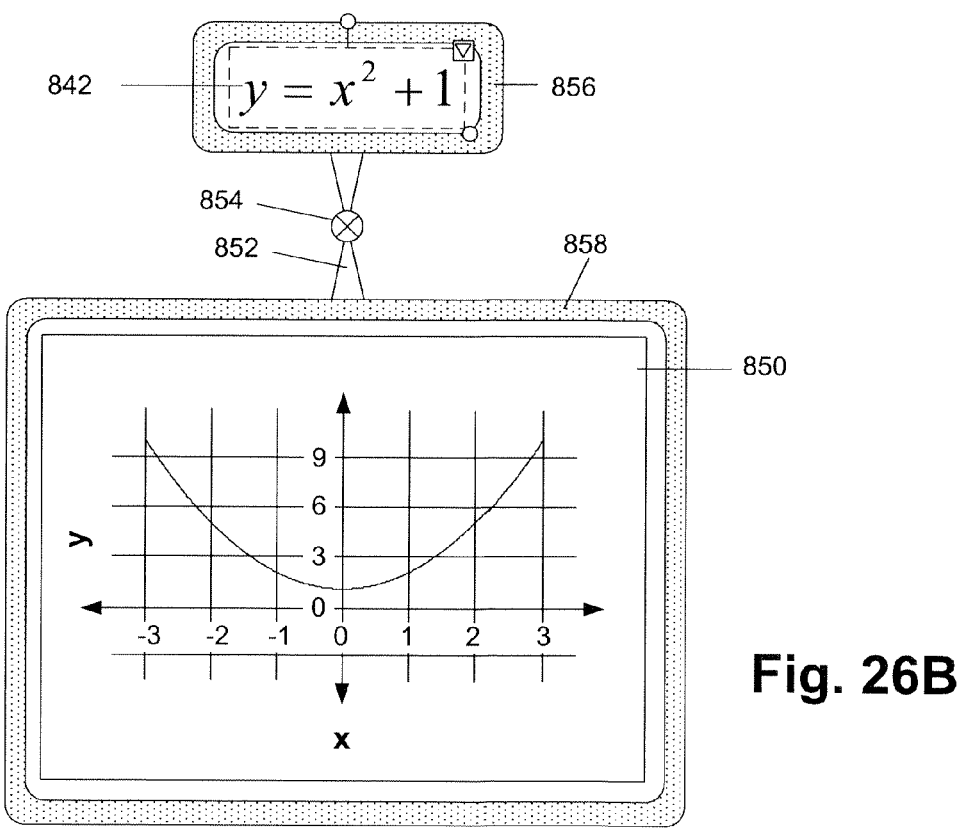

In still another embodiment, a context menu is used to create a mathematical object from a source mathematical object and establish the link between them. For example, in FIG. 26A, the user selects an equation object 842 and then clicks the context menu button 844 to show the context menu 846. The user then selects the menu item "Generate Graph" 848 to generate a graph based on the equation in the equation object 842. In FIG. 26B, a new graph object 850 is created containing a curve representing the equation in the equation object 842. The graph object 850 is linked to the equation object 842. A visual link indicator 852 having a link removal button 854 is created between the two linked objects 842 and 850, which are highlighted by the highlight boxes 856 and 858, respectively.

In above description, when a first mathematical object is linked to a second mathematical object of a different type, the content of the second mathematical object is replaced by the data generated from the first mathematical object. However, those skilled in the art will appreciate that, when linking two mathematical objects having different types, the data of both objects may form a union and then update into both objects. For example, as shown in FIG. 27A, an equation object 902 having an equation $y=x^2+1$ is selected and is then linked to a graph object 904 having a curve representing the function $y=x^3$. After the link between the two objects 902 and 904 is established, as shown in FIG. 27B, the equation object 902 is updated to a simultaneous equation set having the equation $y=x^2+1$ and $y=x^3$, and the graph object 904 is also updated having two curves representing both equations. A visual link indicator 906 having a link removal button 908 is also created and shown on the graphical user interface. The two objects 902 and 904 are also highlighted with the highlight boxes 910 and 912, respectively.

Figure 28A:
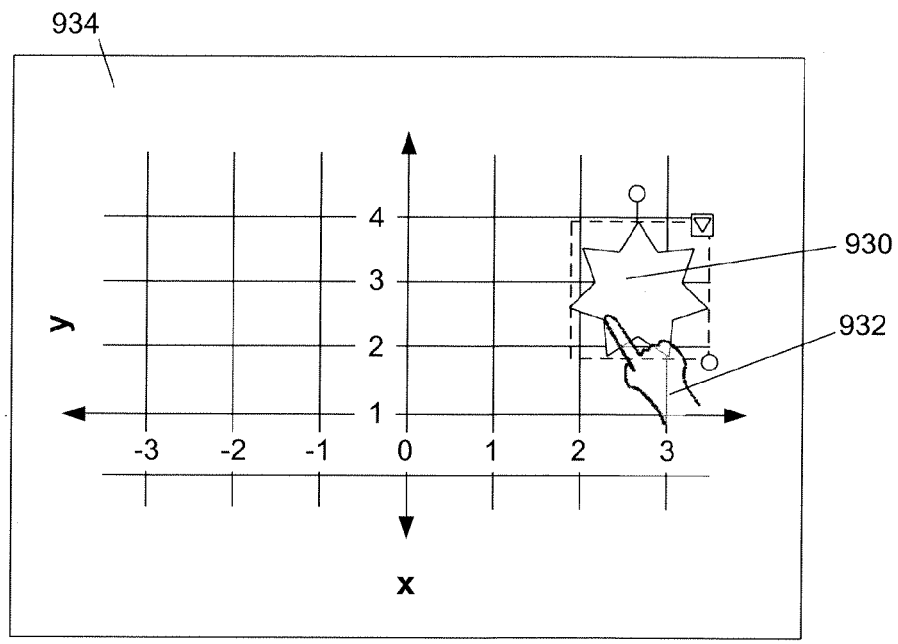
FIGS. 28A and 28B are exemplary illustrations of the graphical user interface when a shape object is converted to a representation on a graph object according to an alternative embodiment.
Figure 28B:
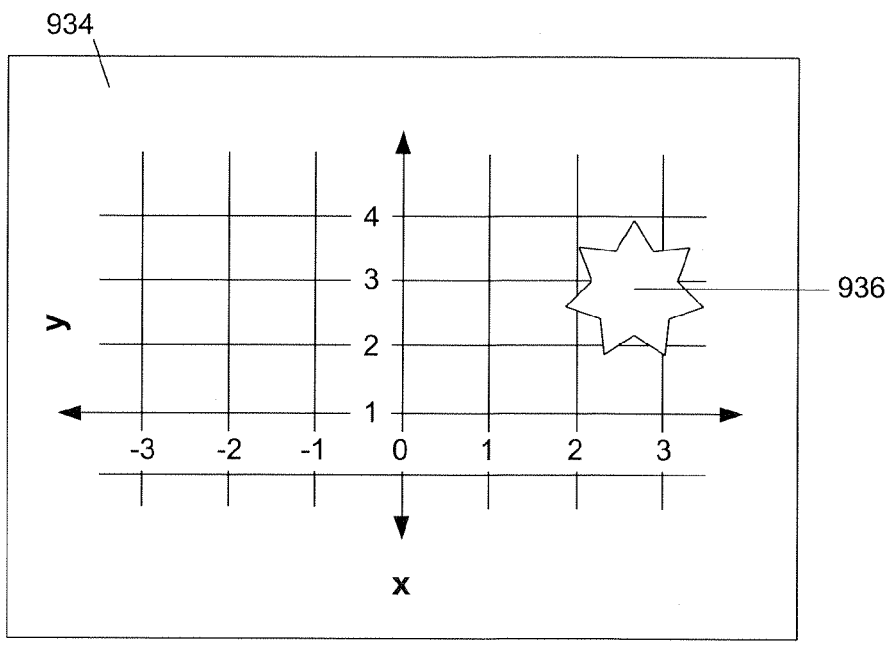
Figure 28C:
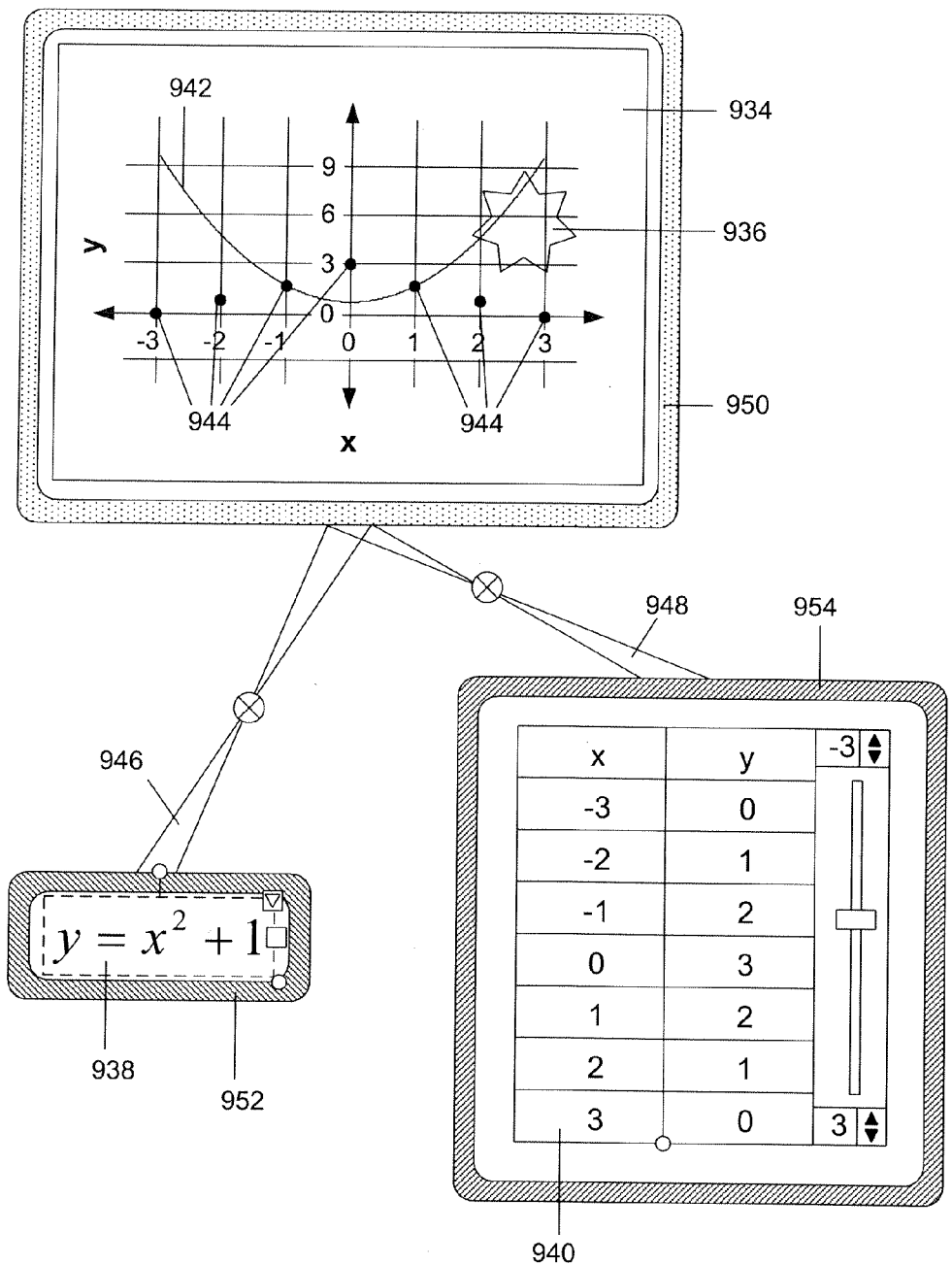
FIG. 28C is an exemplary illustration of the graphical user interface when the graph object is linked to an equation object and also to a table object.

Turning to FIG. 28A, in a still another embodiment, a shape object 930 is dragged by a point 932 into a graph object 934. The processing structure determines the position at which the shape object 930 has been dropped, and determines the coordinates of the vertices of the shape object 930. As shown in FIG. 28B, the shape object is then converted to a chart 936 in the graph object 934, which is drawn in the graph object 934 by using the calculated vertices. As shown in FIG. 28C, the user is able to link an equation object 938 to the graph object 934, and also to link a table object 940 to the graph object 934. The graph object 934 is then updated to show the shape chart 936, the curve representation 942 of the equation object 938, and the dots 944 representing the data in the table object 940. The linkage is visually indicated on the graphical user interface by the link indicators 946 and 948, and the highlight boxes 950, 952 and 954.

In this example, the equation object 938 is linked to the curve 942 in the graph object 934. Therefore, the highlight box 952 of the equation object 938 has the same color as does the curve 942 in the graph object 934. The table object 940 is linked to the dots 944 in the graph object 934. Therefore, the highlight box 954 of the table object 940 has the same color as do the dots 944 in the graph object 934.

In the above embodiments, two mathematical objects are linked in the event that the two objects have different types, and two mathematical objects are merged in the event the second mathematical object has the same type as the first mathematical object. However, those of skill in the art will appreciate that other variations may be made. For example, the first mathematical object may be merged to the second mathematical object no matter whether they have the same type or not. Moreover, when a first mathematical object is dragged to a second mathematical object having the same type, a third object having the same type as both the first and the second mathematical objects may be created and updated by using the data from both the first and the second mathematical objects, and visually link to both the first and the second mathematical objects.

Although embodiments have been described with reference to the drawings, those of skill in the art will appreciate that other variations and modifications from those described may be made without departing from the spirit and scope of the invention, as defined by the appended claims.

What is claimed is:

1. A method for creating a second mathematical object based on a first mathematical object in a computing apparatus having a graphical user interface, said method comprising:
   selecting a first mathematical object in response to an instruction received from a user;
   creating a second mathematical object using data of said first mathematical object;
   linking said first mathematical object to said second mathematical object; and
   creating a visual link between said first mathematical object and said second mathematical object, said visual link including a link removal button displayed in association therewith.

2. The method of claim 1, further comprising:
   displaying said visual link on said graphical user interface in the event that at least one mathematical object with which said visual link is associated is selected.

3. The method of claim 1, further comprising:
hiding said visual link from view on said graphical user interface while no mathematical object with which said visual link is associated is selected.

4. The method of claim 1, further comprising:
in response to activation by a user of said link removal button, identifying said visual link with which said link removal button is associated;
identifying said at least two mathematical objects with which said visual link is associated;
deleting said visual link; and
deleting said link between said at least two mathematical objects.

5. The method of claim 4, further comprising:
highlighting at least one of said first and second mathematical objects.

6. The method of claim 5, wherein said mathematical objects comprise at least one of table objects, graph objects, equation objects and shape objects.

7. The method of claim 1, further comprising:
detecting a change in said first mathematical object; and
in response to the change, updating said second mathematical object using data of said first mathematical object.

8. A method for relating at least two mathematical objects in a computing apparatus having a graphical user interface, said method comprising:
receiving an instruction from a user to associate a shape object with a graph object, said shape object being a different type than said graph object;
determining data of the shape object;
determining a location in said graph object from said received instruction; and
modifying the graph object by drawing a shape therein at said determined location using said determined data of said shape object.

9. The method of claim 8, further comprising:
deleting said shape object.

10. A non-transitory computer readable medium embodying a computer program for creating a second mathematical object based on a first mathematical object in a computing apparatus having a graphical user interface, the computer program comprising:
computer program code selecting a first mathematical object in response to an instruction received from a user;
computer program code creating a second mathematical object using data of said first mathematical object;
computer program code linking said first mathematical object to said second mathematical object; and
computer program code creating a visual link between said first mathematical object and said second mathematical object, said visual link including a link removal button displayed in association therewith.

11. A non-transitory computer readable medium embodying a computer program for relating at least two mathematical objects in a computing apparatus having a graphical user interface, the computer program comprising:
computer program code receiving an instruction from a user to relate a shape object with a graph object, said shape object being a different type than said graph object;
computer program code determining data of the shape object computer program code determining a location in said graph object from said received instruction; and
computer program code modifying the graph object by drawing a shape therein at said determined location using said determined data of said shape object.

* * * * *